United States Patent
Suzuki et al.

(10) Patent No.: US 7,283,637 B2
(45) Date of Patent: Oct. 16, 2007

(54) EXCITING DEVICE

(75) Inventors: Katsutoshi Suzuki, Fukushima-ken (JP); Koichi Saito, Fukushima-ken (JP); Takenobu Horino, Fukushima-ken (JP); Shinichi Higuchi, Fukushima-ken (JP); Katsuji Suzuki, Fukushima-ken (JP); Tetsuya Mitsuishi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 441 days.

(21) Appl. No.: 10/848,613

(22) Filed: May 18, 2004

(65) Prior Publication Data

US 2004/0246109 A1 Dec. 9, 2004

(30) Foreign Application Priority Data

May 23, 2003 (JP) ............................. 2003-146840
May 23, 2003 (JP) ............................. 2003-146848
May 23, 2003 (JP) ............................. 2003-146870

(51) Int. Cl.
*H04R 11/02* (2006.01)
*H04R 9/06* (2006.01)

(52) U.S. Cl. ..................... 381/152; 381/431; 359/444

(58) Field of Classification Search ................ 381/190, 381/191, 203, 388, 402, 173, 316, 320, 152, 381/431, 414, 407; 359/444; 340/384.1
See application file for complete search history.

(56) References Cited

U.S. PATENT DOCUMENTS 3,178,512 A * 4/1965 Ashworth .................... 381/152

5,652,801 A * 7/1997 Paddock ..................... 381/190
6,600,399 B1 * 7/2003 Trandafir .................... 381/422
7,050,600 B2 * 5/2006 Saiki et al. .................. 381/388
2002/0164044 A1* 11/2002 Long et al. .................. 381/431
2003/0059069 A1* 3/2003 Bank et al. .................. 381/152
2003/0081800 A1* 5/2003 Klasco et al. ............... 381/431
2005/0031155 A1* 2/2005 Bachmann et al. .......... 381/431

FOREIGN PATENT DOCUMENTS

WO WO98/52381 11/1998

* cited by examiner

*Primary Examiner*—Daniel Swerdlow
(74) *Attorney, Agent, or Firm*—Brinks Hofer Gilson & Lione

(57) ABSTRACT

An exciting device capable of producing sound by sound-producing vibration body of a main body of an apparatus is provided. An exciting member 32A thin and long in the direction X is provided on a vibration substrate 31 thin and long in the direction X. Both ends of the exciting member 32A are fixed to the vibration substrate 31. Further, a piezoelectric element 33 that functions as vibration generating means is provided in the middle in the direction X of the exciting member 32A. The vibration substrate 31 is directly or indirectly fixed to the sound-producing vibration body. Vibration of the exciting member 32A is transmitted to the sound-producing vibration body through the vibration substrate 31 so that the sound-producing vibration body produces sound.

28 Claims, 28 Drawing Sheets

EXCITING DEVICE

This application claims the benefit of priority to Japanese Patent Application Nos. 2003-146840, 2003-146848 and 2003-146870, herein incorporated by reference.

BACKGROUND OF THE INVENTION

1. Field of the Invention

The present invention relates to a display device in which sound is produced by the surface of a display panel.

2. Description of the Related Art

A panel-shaped speaker is described in a patent document 1 described below. In the patent document 1, on a large panel, panels smaller than the large panel are provided in order to overlap each other. Exciters are provided in the small panels. In the speaker, when the exciters are driven, the small panels vibrate and, at the same time, the vibration of the small panels is transmitted to the large panel so that the large panel and the small panels produce sound.

[Patent Document 1]

PCT Japanese Translation Patent Publication No. 2002-505814

Since it is not possible to mount a speaker in a small portable electronic player, a user listens to music by connecting a headphone or an external connection speaker to the electronic player. When a planar speaker is mounted in such an electronic apparatus, since it is necessary to output sound that is loud to some extent, it is necessary to mount a vibration plate having the area equal to or larger than a predetermined area in the electronic apparatus. However, when the vibration plate of such a size is mounted in the electronic apparatus, it is difficult to miniaturize the electronic apparatus.

However, in the above-mentioned panel-shaped speaker, the small panels having the exciters are provided around the center of the large panel to thus obtain a loud sound. In addition, if necessary, a plurality of exciters is provided in the large panel. Therefore, due to the exciters and the small panels, it is not possible to provide other apparatuses such as a display panel in the hind portion of the large panel. In addition, when the plurality of exciters is mounted, the number of parts increases to thus increase manufacturing costs.

SUMMARY OF THE INVENTION

In order to solve the above problems, it is an object of the present invention to provide an exciting device capable of being mounted in various small electronic apparatuses and of outputting sound having the sound pressure equal to or more than a predetermined sound pressure.

It is another object of the present invention to provide a display device on the backside of which a display panel is provided, the display device capable of generating sound from the surface of the display panel and of being manufactured at a low price.

According to the present invention, there is provided an exciting device, comprising a thin and long exciting member whose length is larger than the width and vibration generating means for vibrating the exciting member. Both ends in the vertical direction of the exciting member can be fixed to sound-producing vibration body of a main body of an apparatus. The vibration of the exciting member is transmitted to the sound-producing vibration body so that the sound-producing vibration body can produce sound.

In the exciting device according to the present invention, the exciting member can be directly attached to the sound-producing vibration body such as the main body of the apparatus or a vibration substrate can be directly attached to the sound-producing vibration body or can be attached to the sound-producing vibration body while interposing a frame. When a vibration generating device vibrates the exciting member, vibration from the exciting member is directly transmitted to the sound-producing vibration body or is transmitted to the sound-producing vibration body through the vibration substrate so that the sound-producing vibration body produces sound. Therefore, the cover of the main body of the apparatus or other sound-producing vibration body produces no sound. Even if the exciting device is mounted in the main body of the small apparatus, there is no increase in the size of the apparatus.

For example, the vibration generating means is a piezoelectric element fixed to the middle of the exciting member.

The vibration generating means comprises a magnet fixed to any one of the middle of the exciting member and the sound-producing vibration body and a coil fixed to the other one. Vibration is transmitted to the exciting member by current that flows to the coil and a magnetic field that is generated by the magnet and crosses the coil.

The exciting device according to the present invention includes the thin and long exciting member whose length is larger than the width, the vibration substrate to which both ends of the exciting member in the vertical direction are directly connected or are indirectly connected with another member interposed, and vibration generating means that vibrates the exciting member.

The vibration substrate can be directly fixed to the sound-producing vibration body such as the main body of the apparatus or can be indirectly fixed to the sound-producing vibration body such as the main body of the apparatus with another member interposed. The vibration of the exciting member is transmitted to the sound-producing vibration body through the vibration substrate so that the sound-producing vibration body can produce sound.

In this case, like in the above-mentioned description, sound is produced by the cover of the main body of the apparatus or from other sound-producing vibration bodies.

According to the present invention, a piezoelectric element fixed to the middle of the exciting member may be used as the vibration generating means. In another case, the vibration generating means may be composed of a magnet fixed to any one of the middle of the exciting member and the vibration substrate and a coil fixed to the other one so that vibration is transmitted to the exciting member by current that flows to the coil and an electric field that is generated by the magnet and crosses the coil.

Further, the exciting member is preferably made of a magnetic material and preferably functions as a magnetic yoke that transmits an electric field generated by the magnet.

The coil may be formed such that vertical electric conduction paths through which current flows in the vertical direction of the exciting member is longer than horizontal electric conduction paths through which current flows in the horizontal direction of the exciting member. The magnet may be formed such that sides that face the vertical electric conduction path are thinner and longer than ends that face the horizontal electric conduction path.

Bent portions whose both sides extending along the vertical direction are bent are preferably provided in the exciting member. The bent portions preferably face the sides of the magnet. The vertical electric conduction paths of the coil are preferably positioned between the bent portions and the sides of the magnet. The bent portions preferably function as counter yokes.

The exciting member has a frequency controlling portion provided between the both ends and the vibration generating means.

In the frequency controlling portion, the sectional area of the exciting member may be smaller than the sectional area of other portions so that the resonance frequency of the exciting member is lowered.

In the frequency controlling portion, the actual length from the vibration generating means to the both ends may increase so that the resonance frequency of the exciting member is lowered.

In the frequency controlling portion, the section of the exciting member may be transformed so that the resonance frequency of the exciting member is high.

According to the present invention, current based on an audio signal may be applied to the vibration generating means so that the sound-producing vibration body produces voice or music.

The exciting device according to the present invention includes a transparent substrate that constitutes a display panel or a transparent substrate positioned on the surface of the display panel, through which the display panel can be seen, an exciting member having an area smaller than that of the transparent substrate and directly fixed to the transparent substrate or indirectly fixed to the transparent substrate with another member interposed, and vibration generating means that vibrates the exciting member.

Sound is produced by the transparent substrate by the vibration of the exciting member and the vibration of the transparent substrate.

For example, the exciting member is thin and long such that the length of the exciting member is larger than the width thereof. Both ends of the exciting member in the vertical direction are fixed to the transparent substrate. The vibration generating means is positioned between fixing portions for fixing the exciting member to the transparent substrate.

According to the present invention, vibration is transmitted to both of the exciting member and the transparent substrate by the vibration generating means so that sound can be produced by the surface of the transparent substrate.

Further, the vibration generating means is composed of a magnet fixed to any one of the transparent substrate and the exciting member and a coil fixed to the other one. Vibration is transmitted to the exciting member by current that flows to the coil and an electric field that is generated by the magnet and crosses the coil.

In this case, the exciting member is preferably made of a magnetic material and preferably functions as a magnetic yoke that transmits the electric field generated by the magnet.

Further, the coil is formed such that vertical electric conduction paths through which current flows in the vertical direction of the exciting member are longer than horizontal electric conduction paths through which current flows in the horizontal direction of the exciting member. The magnet is preferably formed such that the sides that face the vertical electric conduction path are thinner and longer than the ends that face the horizontal electric conduction path. Therefore, it is possible to significantly vibrate the exciting member in the direction perpendicular to the transparent substrate.

Further, a piezoelectric element fixed to the exciting member may be used as the vibration generating means. A magnetostriction oscillator fixed to the exciting member may be used as the vibration generating means. When the piezoelectric element or the magnetostriction oscillator is used as the vibration generating means, it is not necessary to mount an additional member on the transparent substrate compared with a case in which the vibration generating means is composed of the coil and the magnet. Therefore, it is possible to reduce the number of parts and to thus simplify the structure of the exciting device.

When the exciting member and the transparent substrate have the same area, the elastic coefficient of the exciting member due to bending is preferably smaller than the elastic coefficient of the transparent substrate due to bending. In the case where the elastic coefficient of the transparent substrate is set to be larger than the elastic coefficient of the exciting member, when the vibration generating means is driven, it is possible to easily vibrate the exciting member and to thus transmit the vibration generated by the exciting member to the transparent substrate.

As mentioned above, since the area of the exciting member is smaller than the area of the transparent substrate, it is preferable that the elastic coefficient of the exciting member due to bending be smaller than the elastic coefficient of the transparent substrate due to bending, on condition that the area of the exciting member is equal to the area of the transparent substrate, and it is more preferable that the exciting member be longitudinal, the exciting member vibrates due to the vibration applied by the vibration generating means with a large amplitude and the vibration is transmitted to the transparent substrate. It is possible to vibrate the transparent substrate with large amplitude due to the transmission of the vibration and to thus obtain a loud sound from the transparent substrate.

The transparent substrate may be fixed to a frame with an elastic member interposed around transparent substrate. The frame may be fixed to the periphery of the display window of the main body of the apparatus.

The transparent substrate may be fixed to the periphery of the display window of the main body of the apparatus with the elastic member interposed around the transparent substrate.

The transparent substrate may be fixed to the frame with the elastic member interposed around the transparent substrate. The frame may be fixed to the display panel.

The transparent substrate may be fixed to the display panel with the elastic member interposed around the transparent substrate.

The transparent substrate may constitute a part of an input panel.

According to the above-mentioned embodiments, current based on an audio signal is applied to the vibration generating means so that voice or music is produced by the transparent substrate.

Since it is possible to set the resonance frequency of the exciting member to have a low bandwidth, it is possible to produce a low sound due to the vibration of the exciting member. The produced sound is output to the outside through the transparent substrate.

The exciting device according to the present invention includes a vibration substrate capable of being attached to any one position of an armored portion of an electronic apparatus and vibration generating means that transmits vibration to the vibration substrate and makes the armored portion produce sound through the vibration substrate.

In this case, a pressure sensitive adhesive layer capable of being fixed to the armored portion is provided on the vibration substrate.

The current based on the audio signal is applied to the vibration generating means so that the armored portion produces voice or music.

According to an electronic apparatus of the present invention, a vibration substrate is attached to an armored portion of the electronic apparatus and, at the same time, vibration generating means that transmits vibration to the vibration substrate is provided. The vibration generated by the vibration generating means is transmitted to the armored portion through the vibration substrate so that the armored portion produces sound.

The current based on the audio signal is applied to the vibration generating means so that the armored portion produces voice or music.

According to the above-mentioned exciting device or electronic apparatus, the armored portions of computers, various electronic home appliances, or portable electronic apparatuses are sound-producing bodies. The armored portions can produce voice or music.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DESCRIPTION OF THE PREFERRED EMBODIMENTS

Figure 1:
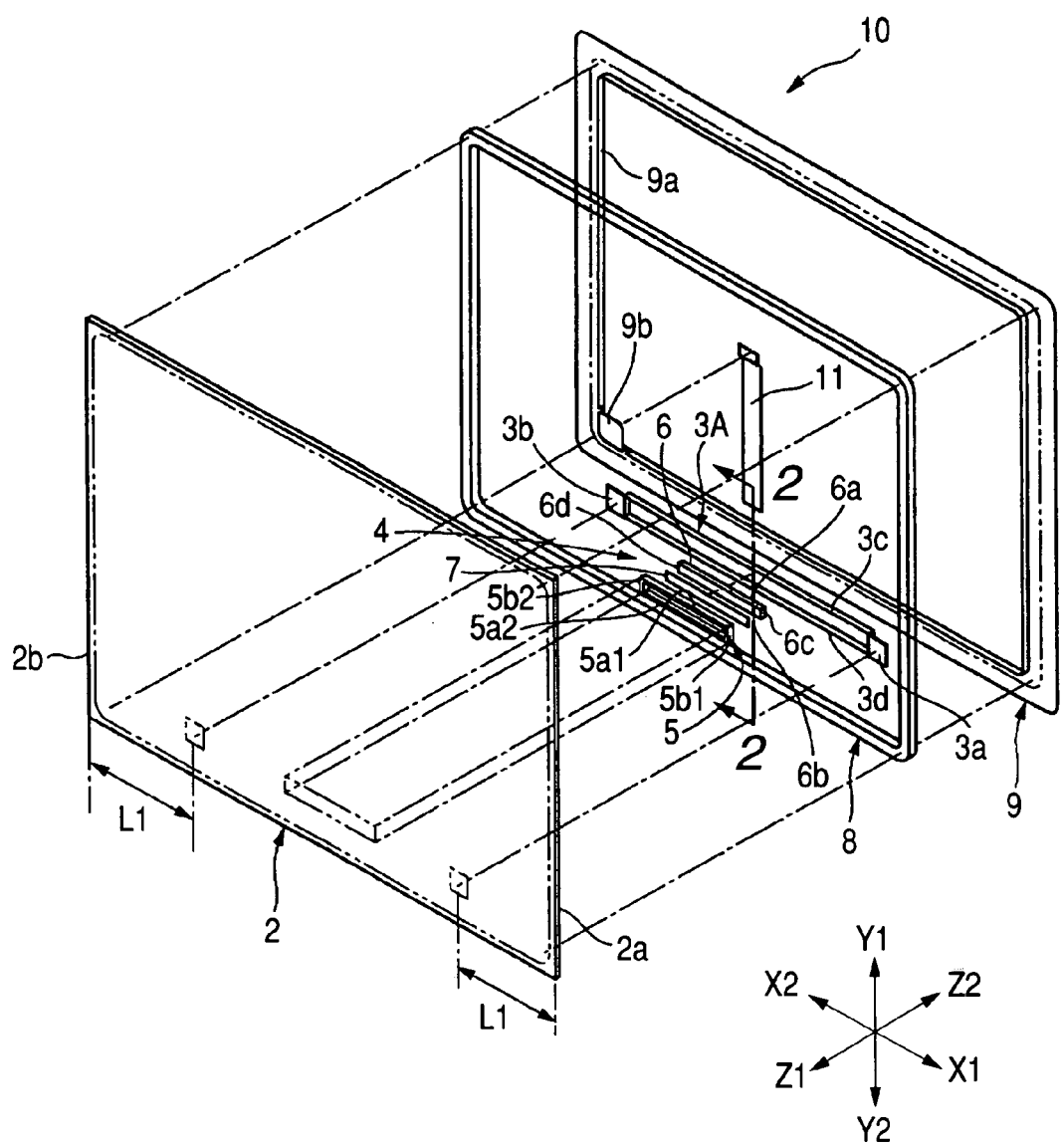
FIG. 1 is an exploded perspective view illustrating an example of an exciting device capable of being mounted on the surface of a display panel.
Figure 2:
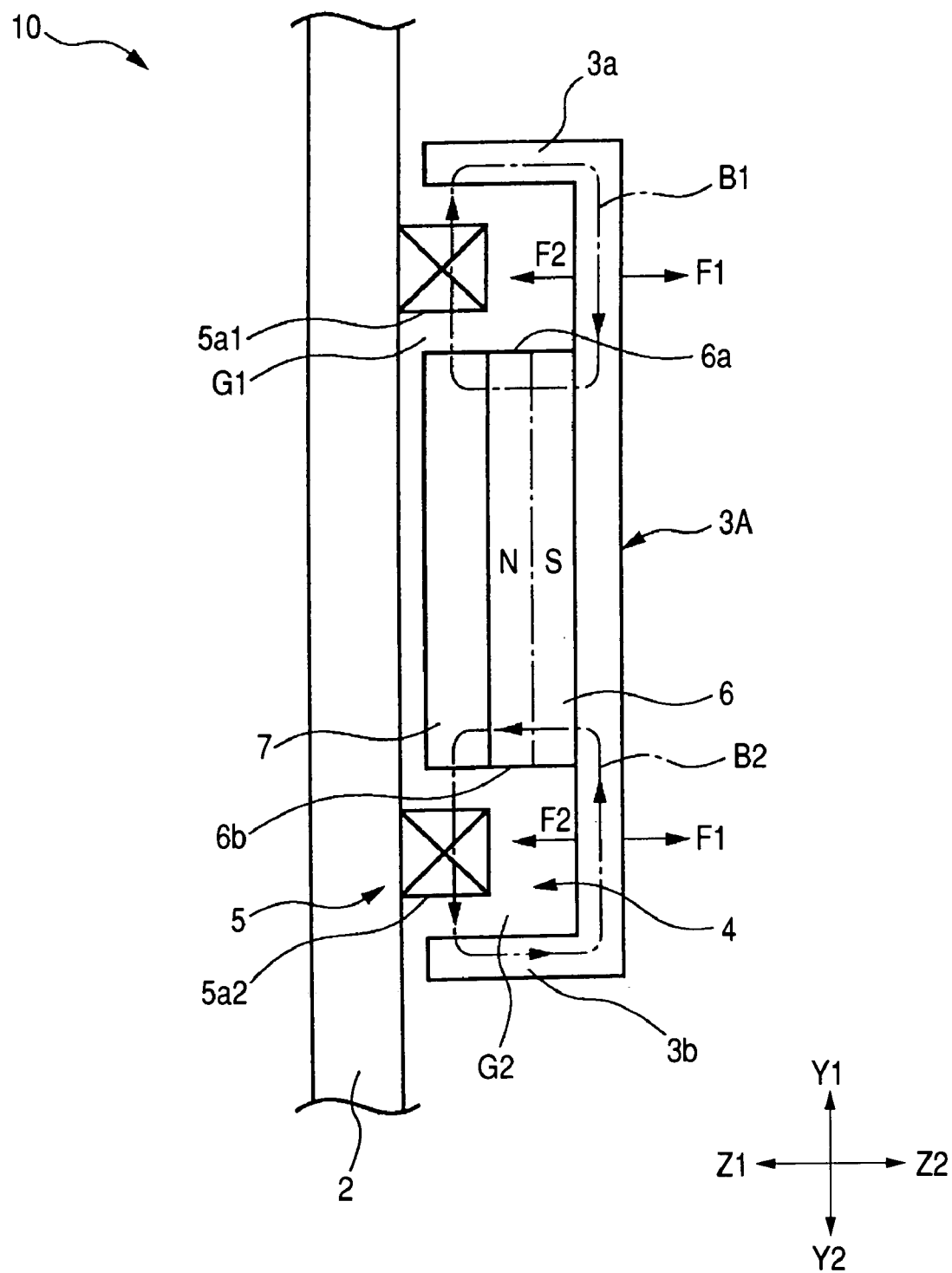
FIG. 2 is a sectional view taken along the line 2-2 of FIG. 1.

FIG. 1 is an exploded perspective view illustrating an example of an exciting device capable of being mounted on the surface of a display panel. FIG. 2 is a sectional view taken along the line 2-2 of FIG. 1.

An exciting device 10 illustrated in FIG. 1 includes a transparent substrate 2, an exciting member 3A, and vibration generating means 4. The transparent substrate 2 is a square substrate made of a material having a high degree of transparency such as acryl resin, polycarbonate, and glass.

The exciting member 3A is made of a magnetic material such as iron and ferrite and has an area much less than the area of the transparent substrate 2. The exciting member 3A is on the side Y2 of the transparent substrate 2 and is mounted from the side Z2. When the length is in the direction X and the width is in the direction Y, the exciting member 3A is formed to be longitudinal so that the length is larger than the width.

Fixing portions 3a and 3b fixed to the transparent substrate 2 are formed in both ends of the exciting member 3A in the vertical direction. That is, according to the embodiment illustrated in FIG. 1, both ends of the exciting member 3A in the direction X are bent in an L shape, respectively. According to the present embodiment, the exciting member 3A functions as a magnetic yoke.

In addition, the exciting member 3A includes bent portions 3c and 3d whose edges on the sides of Y1 and Y2 are bent to be vertical to the transparent substrate 2 and is U-shaped as seen from the plane Y-Z. The bent portions 3c and 3d extend in the vertical direction from the fixing portion 3a to the fixing portion 3b. The bent portions 3c and 3d function as counter yoke according to the present embodiment.

When the fixing portions 3a and 3b are fixed to the transparent substrate 2, the sizes of the fixing portions 3a and 3b are determined so that the tips of the bent portions 3c and 3d do not contact the transparent substrate 2.

As illustrated in FIG. 1, the fixing portions 3a and 3b formed in the exciting member 3A are fixed to the transparent substrate 2 such that the distance L1 between the fixing portion 3a and the edge 2a on the side X1 is equal to the distance L1 between the fixing portion 3b and the edge 2b on the side X2. The two distances are not necessarily equal to each other.

The vibration generating means 4 includes a coil 5 and a magnet 6. The coil 5 is fixed to the transparent substrate 2. The magnet 6 is fixed to the exciting member 3A. In addition, a yoke 7 overlaps the magnet 6 on the surface on the side Z1 of the magnet 6. To the contrary, the coil 5 may be provided on the exciting member 3A and the magnet 6 may be provided on the transparent substrate 2.

As illustrated in FIGS. 1 and 2, the coil 5 is wound along the surface of the transparent substrate 2 in a square shape. Vertical electric conduction paths 5a1 and 5a2 through which current flows in the vertical direction (the direction X) of the exciting member 3A are longer than the horizontal electric conduction paths 5b1 and 5b2 through which current flows in the horizontal direction (the direction Y) of the exciting member 3A.

The magnet 6 is made of a permanent magnet and is thin and longitudinal in the vertical direction (the direction X). In addition, the magnet 6 is fixed to the middle in the direction X of the exciting member 3A with an adhesive interposed. In the magnet 6, sides 6a and 6b that face the vertical electric conduction path 5a1 are thinner and longer than ends 6c and 6d that face the horizontal electric conduction path 5b1.

In addition, the lengths of the vertical direction electric conduction paths 5a1 and 5a2 are slightly larger than the length of the magnet 6. The lengths of the horizontal electric conduction paths 5b1 and 5b2 are slightly larger than the width of the magnet 6. Therefore, the magnet 6 can be inserted into the coil 5.

According to the present embodiment, the magnet 6 is magnetized such that the side Z1 is the N pole and that the side Z2 is the S pole. The side Z1 may be the S pole and the side Z2 may be the N pole.

The yoke 7 is made of the magnetic material such as the iron and the ferrite and has the same area as the area of the magnet 6. In addition, the thickness of the yoke 7 is determined so that the tip on the side Z1 of the yoke 7 when the yoke 7 overlaps the magnet 6 is almost the same as the tips of the bent portions 3c and 3d of the exciting member 3A. The vertical electric conduction path 5a1 is positioned in a gap G1 between the bent portion 3c and the magnet 6 and the yoke 7. The vertical electric conduction path 5a2 is positioned in a gap G2 between the bent portion 3d and the magnet 6 and the yoke 7.

Therefore, according to the present embodiment, the exciting member 3A, the magnet 6, the yoke 7, and the coil 5 forms a magnetic circuit. At this time, a magnetic field B1 crosses the vertical electric conduction path 5a1 of the coil 5 from the side Y2 to the side Y1. A magnetic field B2 crosses the vertical electric conduction path 5a2 from the side Y1 to the side Y2.

Therefore, when the current based on the audio signal flows to the vertical electric conduction path 5a1 from the front side to the inside of the plane of the drawing, driving force F1 is applied from the vertical electric conduction path 5a1 to the exciting member 3A. Current flows to the other vertical electric conduction path 5a2 from the inside to the front side of the plane of the drawing so that the driving forces f1 is applied from the vertical electric conduction path 5a2 to the exciting member 3A. The exciting member 3A protrudes toward the direction Z2 due to the driving force F1, F1. In addition, current in the reverse direction based on the audio signal flows to the vertical electric conduction paths 5a1 and 5a2 so that driving forces F2, F2 are applied from the vertical electric conduction paths 5a1 to 5a2 to the exciting member 3A to thus protrude the exciting member 3A toward the direction of Z1.

When the transparent substrate 2 and the exciting member 3A have the same area, the elastic coefficient of the transparent substrate 2 is larger than the elastic coefficient of the exciting member 3A so that it is more difficult for the transparent substrate 2 to be bent than the exciting member 3A. Therefore, when the driving forces F1 and F2 are generated, the exciting member 3A vibrates more in the direction Z1-Z2 than the transparent substrate 2 and the vibration is transmitted to the transparent substrate 2 through the fixing portions 3a and 3b of the exciting member 3A so that voice or music is produced by the transparent substrate 2. At this time, since the exciting member 3A vibrates with large amplitude, it is possible to significantly vibrate the vibration substrate 21 and to thus increase sound pressure.

As illustrated in FIG. 1, in the exciting device 10, a square frame-shaped elastic member 8 is fixed around the transparent substrate 2 from the side Z2. In addition, a square frame-shaped frame 9 is adhesively fixed to the elastic member 8.

The elastic member 8 is made of foamed polyethylene resin without being restricted to this. The elastic member 8 may be the member made of a rubber material such as synthetic resin and silicon rubber or may be the member made of other resin compositions.

The frame 9 is made of a metal or synthetic resin and includes a reinforcing portion 9a whose internal circumference edge is perpendicularly bent to the side Z1. The frame 9 is not easily bent by way of forming the reinforcing portion 9a. In addition, a square attaching portion 9b parallel to the transparent substrate 2 is integrated with the frame 9 at a corner of the frame 9.

The exciting device 10 overlaps a thin display panel such as liquid crystal and organic EL (electroluminescence) on the front surface of the display panel to thus form a display device having a function of producing sound.

Figure 11:
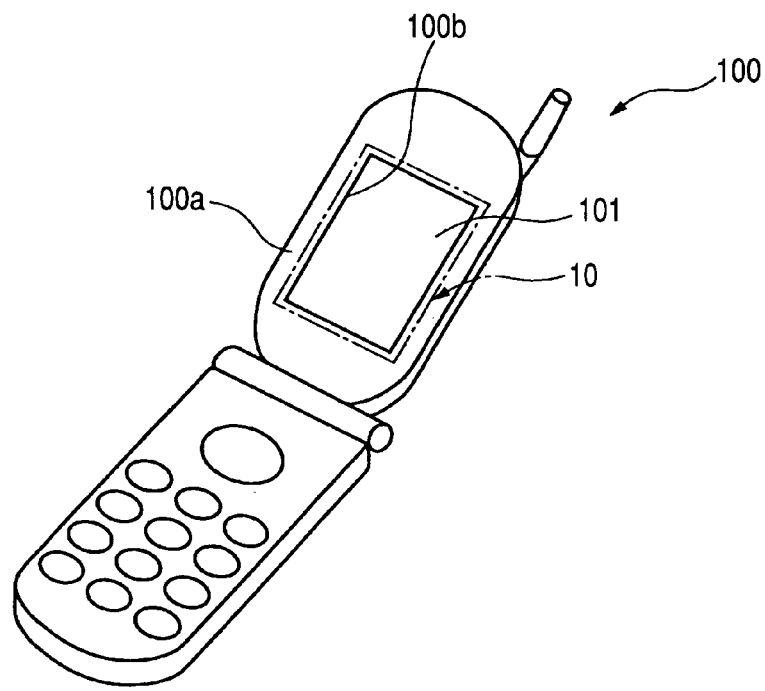
FIG. 11 is a perspective view illustrating an example of mounting a display device in an electronic apparatus.

For example, as illustrated in FIG. 11, it is possible to provide the exciting device 10 on a display panel 101 of a mobile telephone 100 as an electronic apparatus. In this case, the frame 9 may be adhesively fixed around the surface of the display panel 101 or may be fixed around a display window 100b of an armored portion 100a of the mobile telephone 100.

Figure 17:
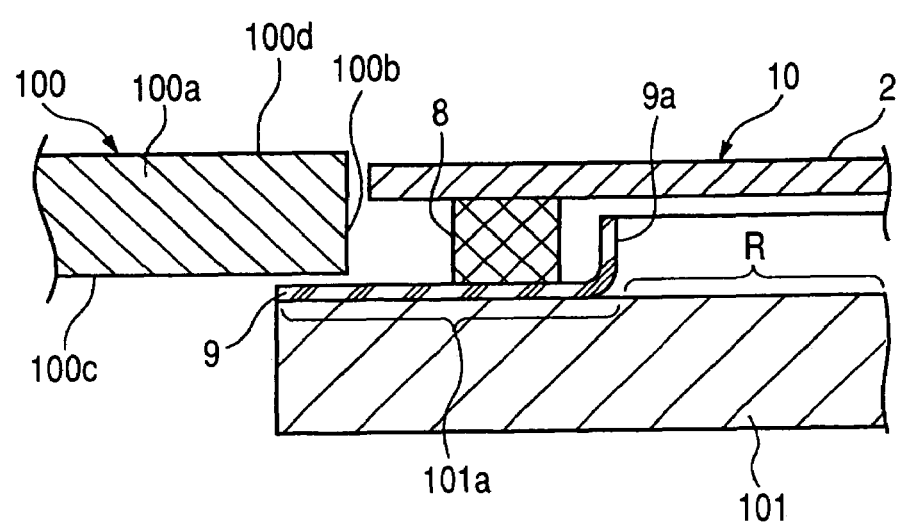
FIG. 17 is a partially enlarged sectional view illustrating another example of assembling a display device with the armored portion.

As illustrated in FIG. 17, in the display device, the frame 9 is not fixed to a display region R on the surface of the display panel 101 but to an edge 101a positioned outer than the display region R and is inserted from the back side of the armored portion 100a and is fixed with respect to the display window 100b formed in the armored portion 100a of the mobile telephone 100. In this case, the outer circumference edge of the frame 9 is horizontally longer than the outer circumference edge of the transparent substrate 2. Therefore, when the display device is inserted from the backside of the display window 100b, the outer circumference edge of the frame 9 is blocked by the backside 100c of the armored portion 100a. Therefore, it is possible to prevent the display device from being separated from the display window 100b. At this time, the surface 100d of the armored portion 100a and the surface of the transparent substrate 2 may be determined to be on a level so that the surface of the display device is even.

In addition, the transparent substrate 2 may constitute a part of an input panel. The input panel has a shape of sheet and is coordinate input means that can input various manipulation data by moving fingers or pens along the surface of a sheet. As the coordinate input means, resistive and electrostatic capacitive coordinate input means are used. Detection sheets composed of a pair of transparent resin sheets on which transparent electrodes opposite to each other are provided may be used as the coordinate input means. Thus formed input panel may be arranged in front of or behind the transparent substrate 2 so as to overlap the transparent substrate 2. In addition, the transparent substrate 2 may be used as one of the pair of detection sheets.

Figure 3:
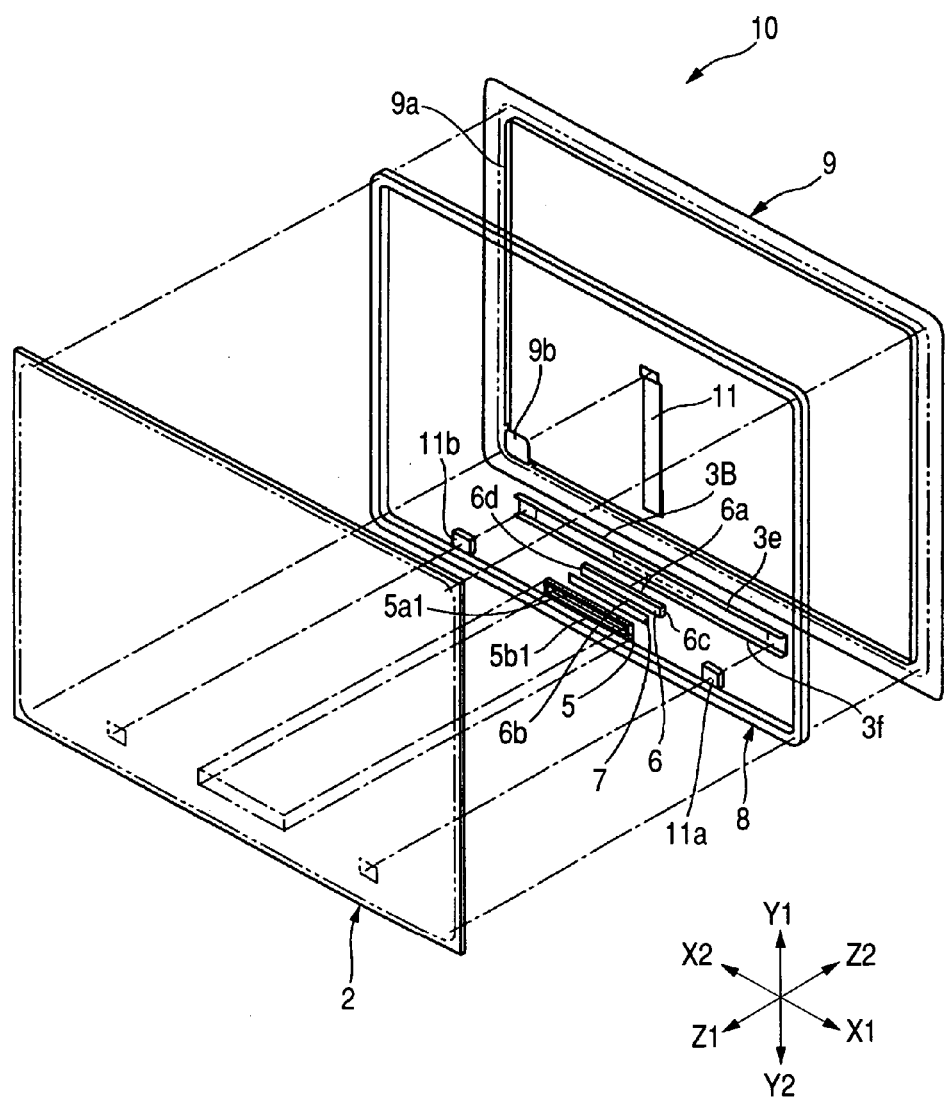
FIG. 3 is an exploded perspective view illustrating a modification of the exciting device illustrated in FIG. 1.

FIG. 3 is a modification of the exciting device 10 as shown in FIG. 1. The modification is the same as the above-mentioned embodiment excluding the structure of the exciting member 3A. The same portions will be denoted by the same reference numerals and description thereof will be omitted.

An exciting member 3B illustrated in FIG. 3 is thin and long such that the length in the vertical direction (the direction X) is larger than the length in the width direction. Bent portions 3e and 3f formed by bending edges on the sides of Y1 and Y2 in the direction of the width to the side Z1 extend in the vertical direction. The bent portions 3e and 3f are bent from the end on the side X1 to the end on the side X2. In addition, square fixing portions 11a and 11b are fixed to both ends of the exciting member 3B in the vertical direction with an adhesive interposed on the side Z1. The fixing portions 11a and 11b are made of, for example, foamed acryl resin capable of being elastically transformed. In addition, the coefficients of elasticity of the fixing portions 11a and 11b vary from high ones to low ones.

Therefore, according to the embodiment illustrated in FIG. 3, when current based on the audio signal or a music signal flows to the coil 5, the exciting member 3B vibrates in the direction Z1-Z2 due to the magnetic driving power applied to the vertical electric conduction paths 5a1 and 5a2. The vibration of the exciting member 3B is transmitted to the transparent substrate 2 through the fixing portions 11a and 11b so that the voice or the music is produced by the surface of the transparent substrate 2.

According to the modification of FIG. 3, the exciting device 10 can be provided on the surface of the display panel 101 so that the images of the display panel 101 can be seen through the transparent substrate 2 and that sound can be produced by the surface of the display panel 101.

Figure 4:
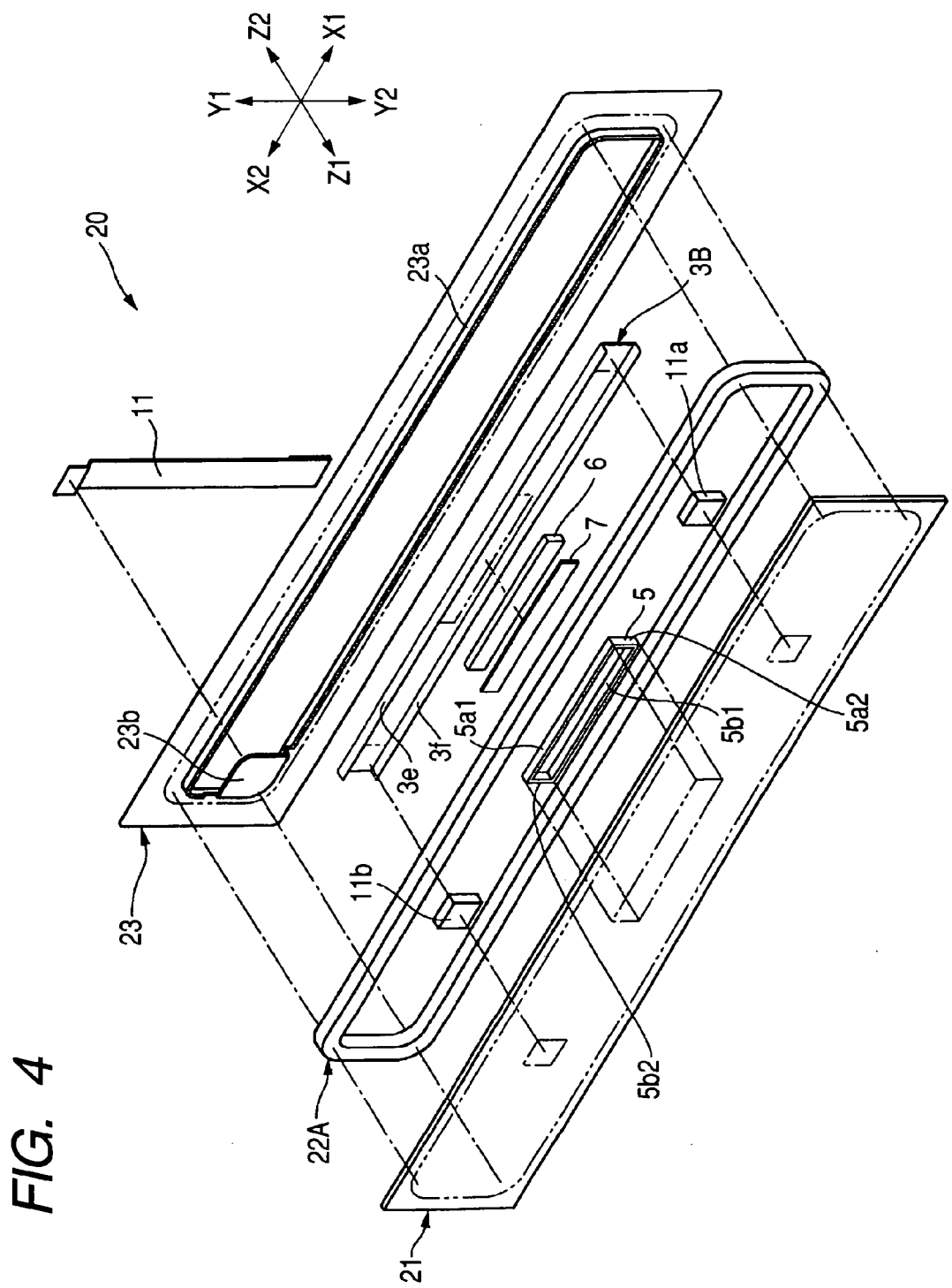
FIG. 4 is an exploded perspective view illustrating an example of an exciting device capable of being mounted in an armored portion of an electronic apparatus.

FIG. 4 illustrates an exciting device capable of being mounted in an armored portion of an electronic apparatus. The exciting device 20 includes a black vibration substrate 21 that does not transmit light. The vibration substrate 21 is made of a non-conductive member such as synthetic resin such that the size in the direction X is larger than the size in the Y direction.

Like in FIG. 3, both ends of the exciting member 3B in the vertical direction are fixed to the vibration substrate 21 with the fixing portions 11a and 11b interposed. The coil 5 as vibration generating means is fixed to the vibration substrate 21. The magnet 6 and the yoke 7 are fixed to the exciting member 3B.

A frame 23 formed to be thin and long in the direction X faces the vibration substrate 21. An elastic member 22A is inserted into and fixed to between the vibration substrate 21 and the frame 23. Like the vibration substrate 21, the frame 23 is thin and long in the direction X. A reinforcing portion 23a whose internal circumference edge is bent and an attaching portion 23b at a corner of the internal circumference edge are integrated with the frame 23.

Figure 12:
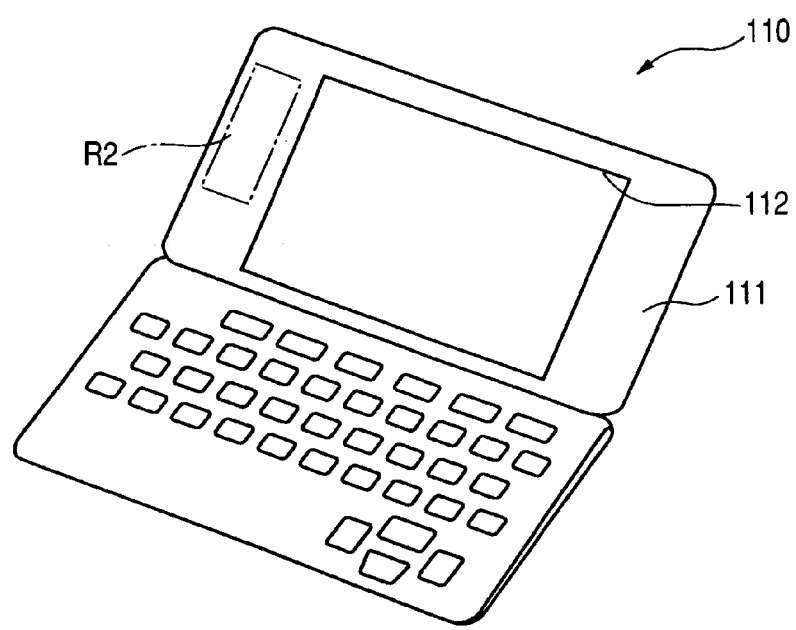
FIG. 12 is a perspective view illustrating an example of mounting an exciting device in an electronic apparatus.

As illustrated in FIG. 12, the exciting device 20 can be mounted in a small electronic dictionary 110 as an electronic apparatus (the main body of an apparatus). In this case, the exciting device 20 is provided in a region marked with one-dot chain line R2 around a display window 112 of an armored portion 111 of an electronic dictionary 110. The exciting device 20 is not restricted to this region.

Figure 15:
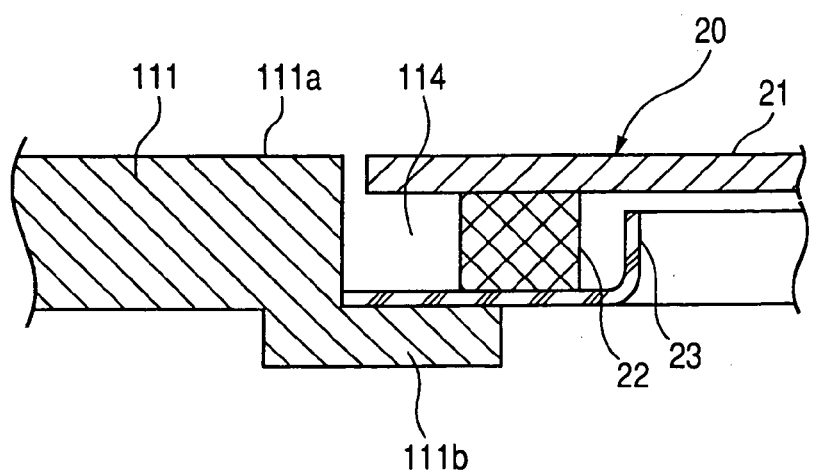
FIG. 15 is a partially enlarged sectional view illustrating another example of assembling the exciting device with the armored portion.

According to a method of attaching the exciting device 20 to the electronic dictionary 110, as illustrated in FIG. 15, a concave portion 114 is formed in sound-producing vibration body 111a of the armored portion 111 and the exciting device 20 is provided in the concave portion 114. The sound-producing vibration body 111a is a part of a case positioned in the outer most side of each of various electronic apparatuses and made of the synthetic resin or the metal. In this case, a locking portion 111b that protrudes inside is formed on the inner wall of the concave portion 114. When the exciting device 20 is inserted from the outside of the armored portion 111, the frame 23 of the exciting device 20 is blocked by the locking portion 111b. At this time, the depth of the concave portion 114 is equal to the thickness of the exciting device 20 so that the surface of the vibration substrate 21 and the surface of the sound-producing vibration body 111a of the armored portion 111 are on a level.

Figure 16:
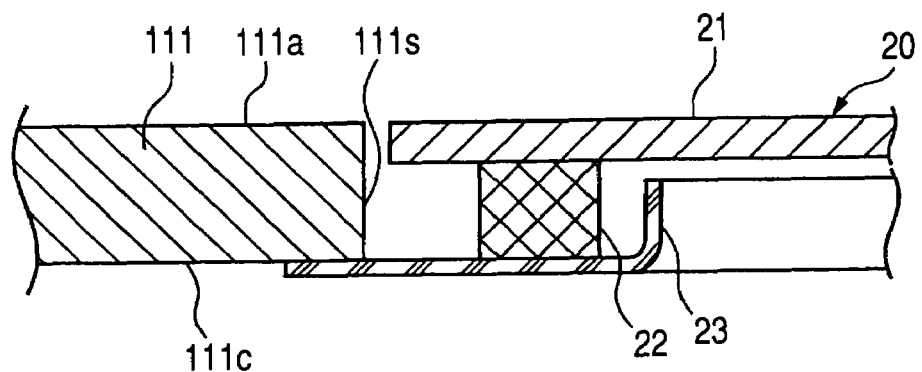
FIG. 16 is a partially enlarged sectional view illustrating another example of assembling the exciting device with the armored portion.

As illustrated in FIG. 16, a hole ills having the diameter equal to the distance from the surface to the back side of the armored portion 111 is formed so that the external diameter of the frame 23 is larger than the external diameter of the vibration substrate 21 and that the exciting device 20 is inserted from the back side of the armored portion 111 and then mounted in it. Therefore, the outer circumference edge of the frame 23 is blocked by the backside 111c of the armored portion 111 to thus prevent the exciting device 20 from getting out of the hole 111s.

Figure 13:
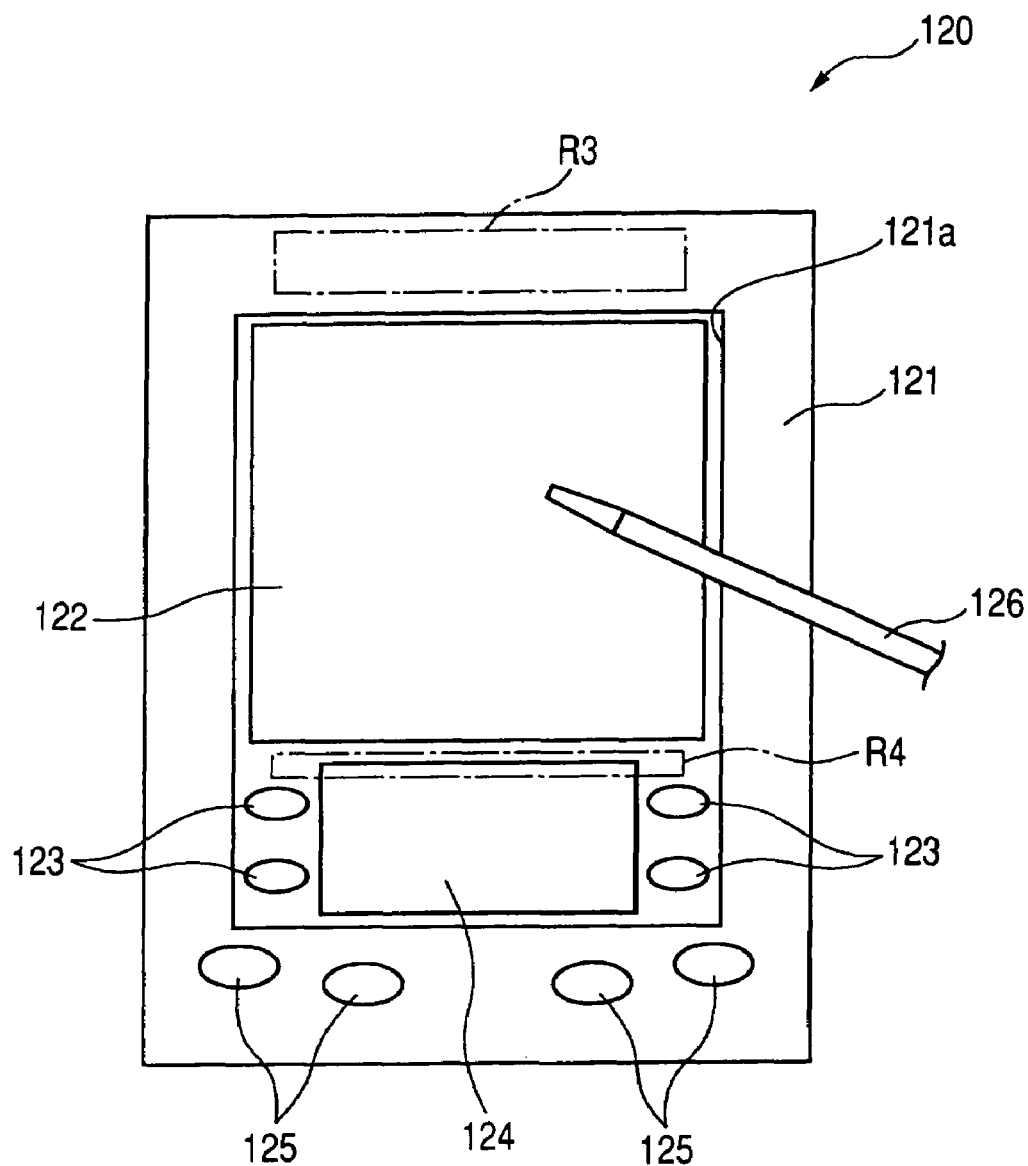
FIG. 13 is a perspective view illustrating another example of mounting the exciting device in the electronic apparatus.

As illustrated in FIG. 13, the exciting device 20 can be mounted in a personal digital assistant (PDA) 120 as an electronic apparatus. In the PDA 120, a square display window 121a is formed in an armored portion 121. A display panel 122, a plurality of pressing input portions 123, and a writing input portion 124 capable of performing an input using a pen 126 are provided in the display window 121a. In addition, the entire display window 121a is covered with a transparent protection panel. A plurality of button manipulation portions 125 is provided around the display window 121a of the armored portion 121.

In the PDA 120, the exciting device 20 can be provided in a region marked with a one-dot chain line R3 around the display window 121a or in a region marked with a one-dot chain line R4 around the display panel 122. As mentioned above, since the exciting device 20 can be provided in a region excluding the display region of the display panel 122, it is possible to add a function of producing sound without narrowing the visible range of a user. In addition, the exciting device 20 can have a feedback function of endowing a manipulation sense during the input manipulation of the user by the pen 126. The arrangement position of the exciting device is not restricted to the regions R3 and R4. The exciting device may be provided in other portions such as the backside and the side.

Figure 5:
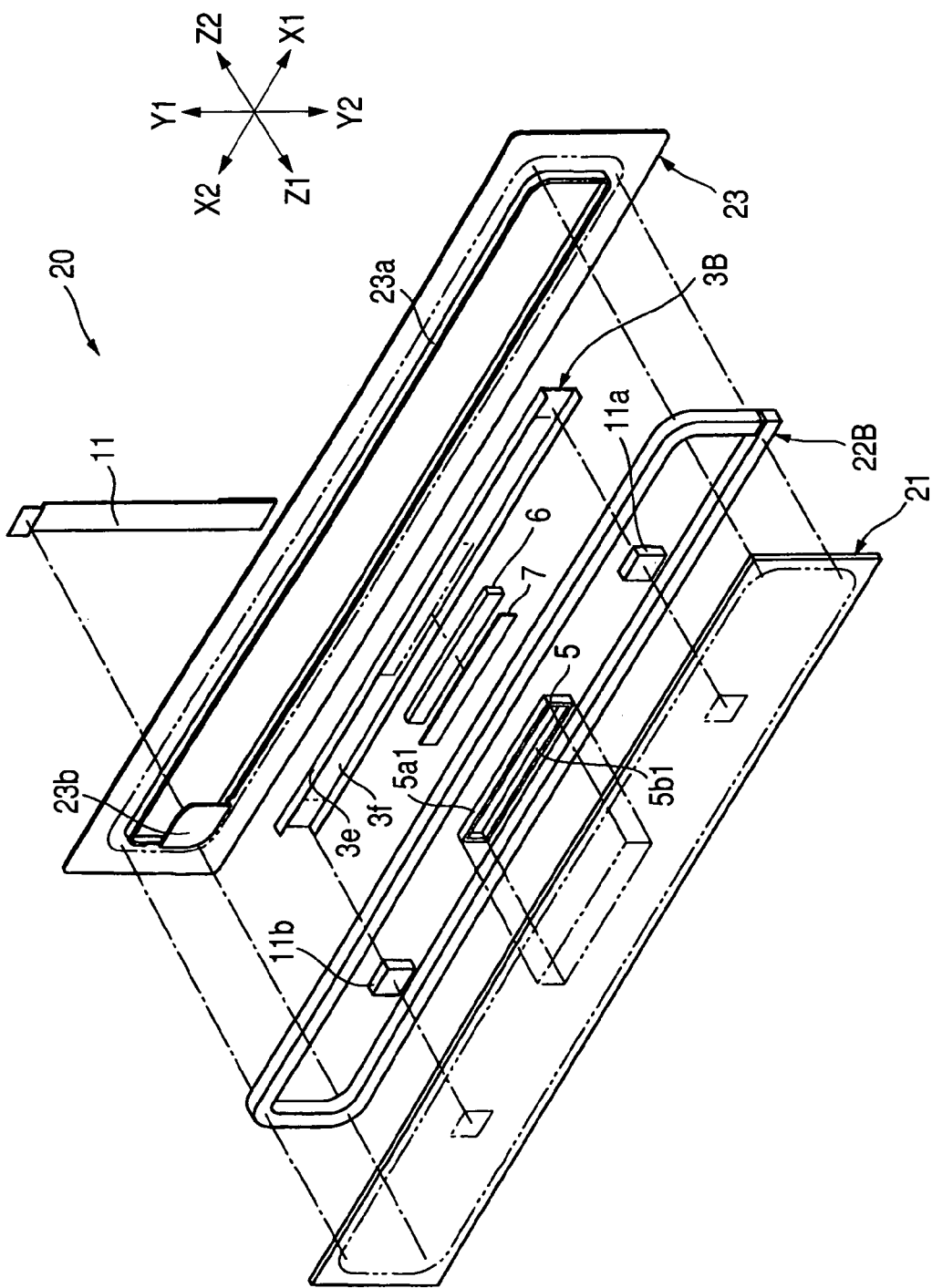
FIG. 5 is an exploded perspective view illustrating a modification of the exciting device of FIG. 4.

FIG. 5 illustrates a modification of the exciting device 20. The structure of the exciting device 20 in the modification is the same as the structure of the exciting device 20 illustrated in FIG. 4 excluding the structure of the elastic member.

An elastic member 22B of the exciting device 20 illustrated in FIG. 5 is a square rod that is thin and long and is fixed around the vibration substrate 21. Since the elastic member 22A illustrated in FIG. 4 is dug through a member in the shape of a frame, a large amount of unnecessary portion is generated during the processes of manufacturing one elastic member 22A, which is disadvantageous in view of costs. According to the elastic member 22B illustrated in FIG. 5, since a material is hardly wasted, it is possible to remarkably improve the yield of the material.

Figure 6:
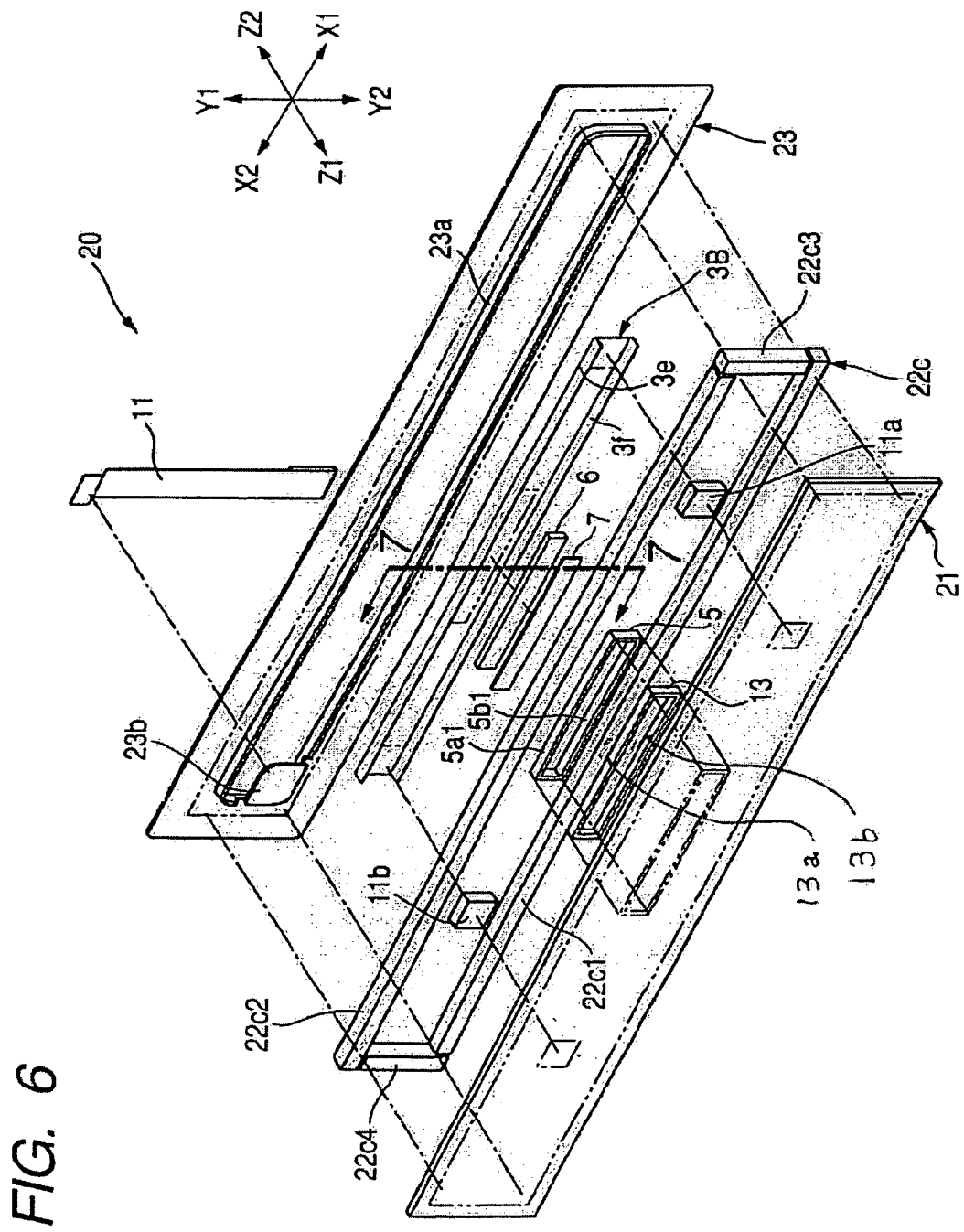
FIG. 6 is an exploded perspective view illustrating a modification of vibration generating means.

FIG. 6 is another embodiment of the exciting device 20 illustrated in FIGS. 4 and 5, in which the structures of the elastic member and the vibration generating means are different from those mentioned above. An elastic member 22C illustrated in FIG. 6 includes vertical elastic portions 22c1 and 22c2 extended long in the direction X (in the vertical direction) and horizontal elastic portions 22c3 and 22c4 extended short in the direction Y (in the horizontal direction). In the elastic member 22C, the tip on the side X2 of the vertical elastic portion 22c1 is positioned on the side in the end of the side Y2 of the horizontal elastic portion 22c4. The tip on the side Y1 of the horizontal elastic portion 22c4 is positioned on the side in the end of the side X2 of the vertical elastic portion 22c2. The tip on the side X1 of the vertical elastic portion 22c2 is positioned on the side in the end of the side Y1 of the horizontal elastic portion 22c3. The tip on the side Y2 of the horizontal elastic portion 22c3 is positioned on the side in the end on the side X1 of the vertical elastic portion 22c1. Therefore, the elastic member 22C is fixed to the vibration substrate 21.

According to the elastic member 22C illustrated in FIG. 6, it is possible to improve the yield of the material as compared with the elastic member 22A. In addition, even if the degrees of precision of the parts of the respective elastic portions 22c1 to 22c4 are reduced, the elastic portions 22c1 to 22c4 can sufficiently display functions as elastic members. Therefore, it is possible to reduce manufacturing costs.

On the other hand, in the exciting device 20 illustrated in FIG. 6, another yoke 13 is provided on the vibration substrate 21. The yoke 13 is formed in the shape of a square frame and includes vertical yokes 13a and 13b along the vertical electric conduction paths 5a1 and 5b1.

Figure 7:
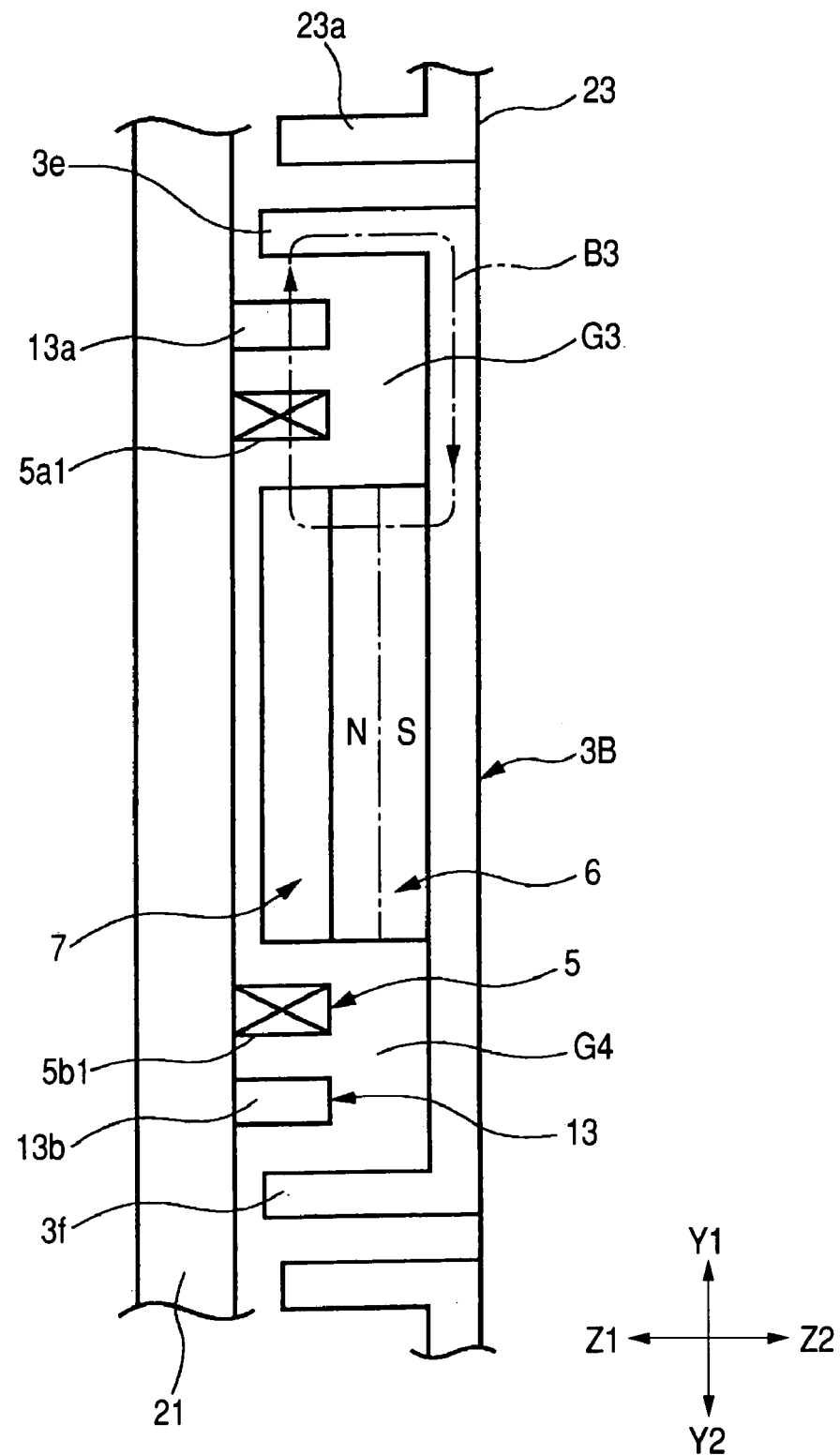
FIG. 7 is a sectional view taken along the line 7-7 of FIG. 6.

Therefore, as illustrated in the sectional view of FIG. 7, a magnetic circuit is comprised of the exciting member 3B including the bent portions 3e and 3f, the magnet 6 and the yoke 7, and the coil 5 and the vertical yokes 13a and 13b. The vertical electric conduction paths 5a1 and 5b1 and the vertical yokes 13a and 13b of the coil 5 are inserted into gaps G3 and G4 formed between the bent portions 3e and 3f and the magnet 6 and the yoke 7.

Therefore, a magnetic circuit that passes through the yoke 7, the vertical electric conduction path 5a1, the vertical yoke 13a, the exciting member 3B, and the S pole of the magnet 6 from the N pole of the magnet 6 is formed. Therefore, it is possible to improve the magnetic efficiency of the magnetic field B3 that crosses the vertical electric conduction path 5a1. As a result, it is possible to more strongly vibrate the exciting member 3B so that an output by a large sound pressure can be made. In addition, though not shown, like the configuration, in the vertical electric conduction path 5b1 side, a magnetic circuit is formed so that a magnetic field in a direction reverse to the direction of the magnetic field B3 is generated.

Figure 8:
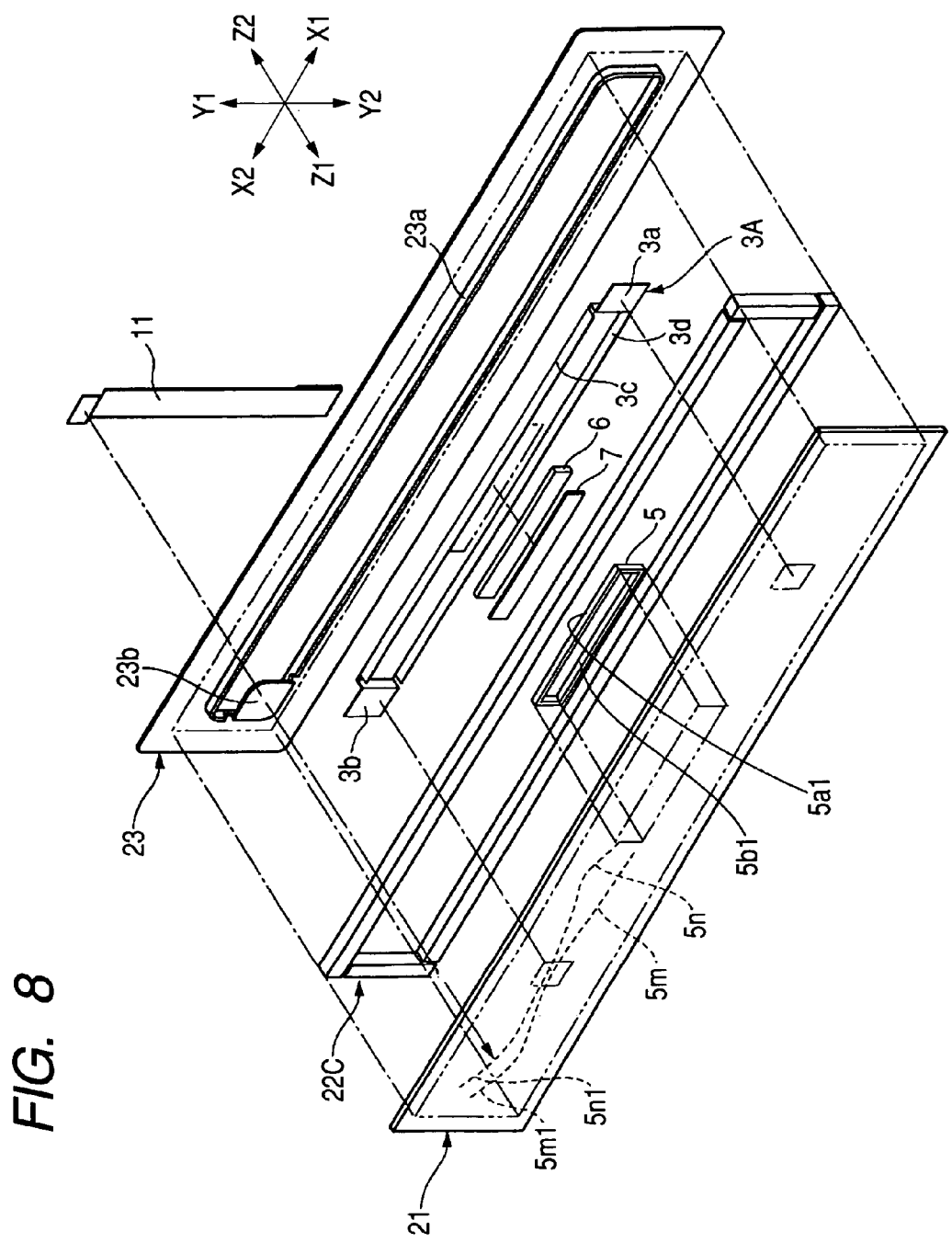
FIG. 8 is a perspective view illustrating a method of connecting a coil to a substrate.

FIG. 8 illustrates a method of connecting the coil 5 to the flexible substrate 11. Leads 5m and 5n on both ends of the coil 5 extend along the surface of the vibration substrate 21 in the direction X2. Further, the leads 5m and 5n extend to the positions in which the tips 5m1 and 5n1 face the attaching portion 23b of the frame 23.

When the vibration substrate 21 is fixed to the frame 23 with the elastic member 22C interposed, the tip of the flexible substrate 11 is soldered to the attaching portion 23b in a state where the tips 5m1 and 5n1 are interposed between the vibration substrate 21 and the attaching portion 23b. At this time, the attaching portion 23b is made of a conductive member so that the flexible substrate 11 and the tips 5m1 and 5n1 are electrically connected to each other with the attaching portion 23b interposed. Further, the tips 5m1 and 5n1 may be mounted on the surface of the attaching portion 23b on the side Z2 so that the tips 5m1 and 5n1 are directly connected to the flexible substrate 11.

Figure 10:
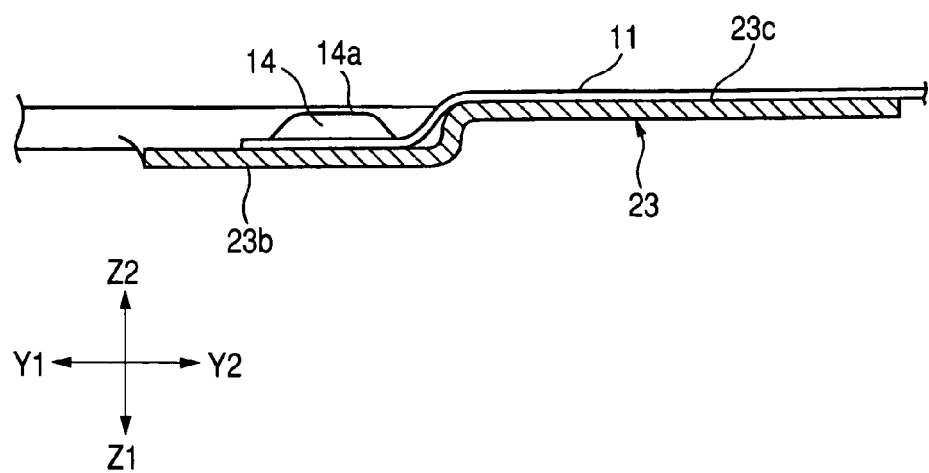
FIG. 10 is a sectional view illustrating a method of attaching a frame to a substrate.

Further, in the above-mentioned soldering, as illustrated in FIG. 10, when the surface of the attaching portion 23b and an installation surface 23c are stepped and the flexible substrate 11 is fixed to the attaching portion 23b by soldering 14, the head 14a of the soldering 14 does not protrude from the installation surface 23c of the frame 23. Therefore, when the installation surface 23c of the frame 23 is fixed to an armored portion of an electronic apparatus, it is possible to not damage attachment between the installation surface 23c and the armored portion. In addition, since the tips 5m1 and 5n1 of the leads 5m and 5n become stable by the attaching portion 23b, it is possible to prevent the tips 5m1 and 5n1 from undesirably contacting other members.

Figure 9:
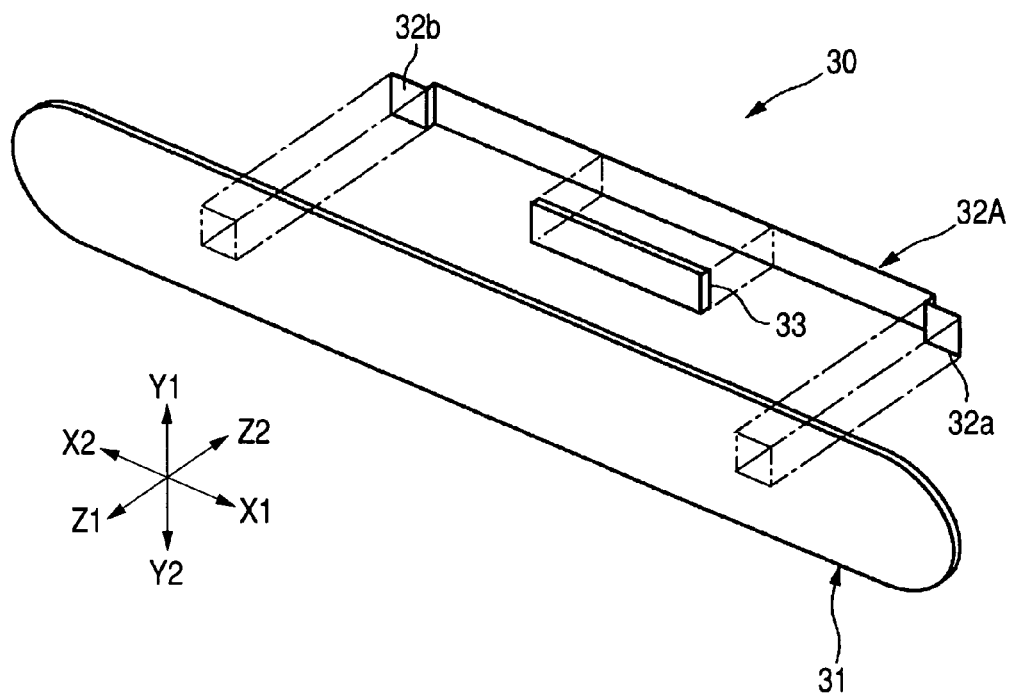
FIG. 9 is an exploded perspective view illustrating another exciting device capable of being mounted in the armored portion of the electronic apparatus.

FIG. 9 is an exploded perspective view illustrating another exciting device capable of being mounted in the armored portion of the electronic apparatus. An exciting device 30 includes a vibration substrate 31, an exciting member 32A, and vibration generating means.

The vibration substrate 31 is a thin plate made of opaque synthetic resin and extends in the direction X with uniform width to thus form a band. The exciting member 32A is thin and long such that the length in the vertical direction (the direction X) is larger than the width in the horizontal direction (the direction Y). In addition, in the exciting member 32A, both ends in the direction X are bent in the shape of L to thus form fixing portions 32a and 32b. The fixing portions 32a and 32b are fixed to the surface on the side Z2 of the vibration substrate 31 with an adhesive interposed.

The vibration generating means is made of a material capable of being bent in the direction Z1-Z2 when electricity flows, such as a piezoelectric element 33. The piezoelectric element 33 is formed of an element made of a laminated substance, for example. The width of the piezoelectric element 33 is equal to the width of the exciting member 32A. The length in the vertical direction (the direction X) is much shorter than the length in the vertical direction of the exciting member 32A. Therefore, the piezoelectric element 33 is fixed to the middle of the exciting member 32A.

In the exciting device 30 formed as mentioned above, when electricity flows to the piezoelectric element 33 based on an audio signal or a music signal, the exciting member 32A vibrates in the direction Z1-Z2 and the vibration is transmitted to the vibration substrate 31 with the fixing portions 32a and 32b interposed.

The exciting device 30 can be mounted in the armored portions 100a, 111, and 121 of various electronic apparatuses such as the mobile telephone 100, the electronic dictionary 110, and the PDA 120 illustrated in FIGS. 11 to 13.

Figure 14:
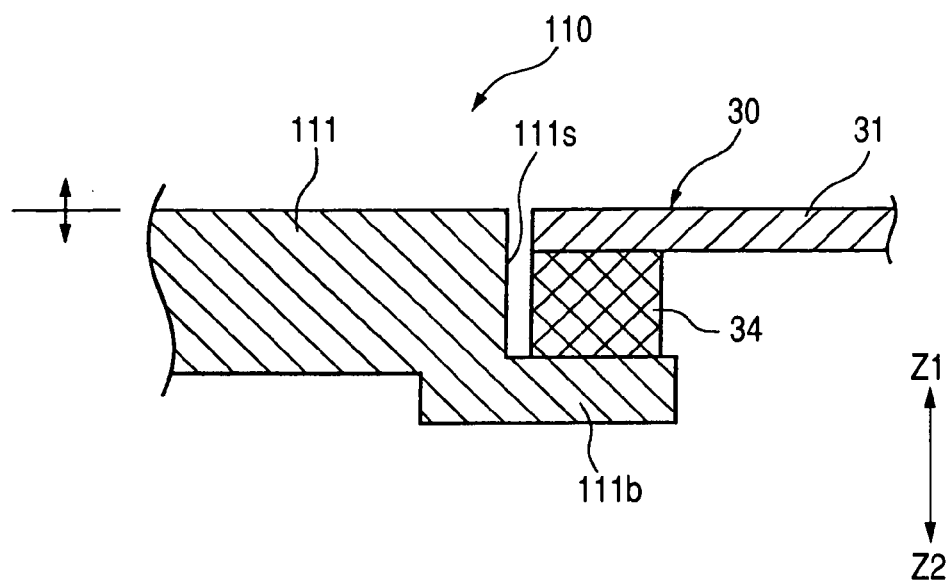
FIG. 14 is a partially enlarged sectional view illustrating an example of assembling an exciting device with an armored portion.

As illustrated in FIG. 14, as a method of providing the exciting device 30 in the armored portions, for example, the exciting device 30 is inserted into the hole 111s formed in the armored portion 111. In this case, in the inside edge of the hole ills, a locking portion 111b that protrudes inside is formed and an elastic supporting member 34 is provided on the surface on the side Z1 of the locking portion 111b so that both ends in the direction X of the vibration substrate 31 are supported.

Figure 18:
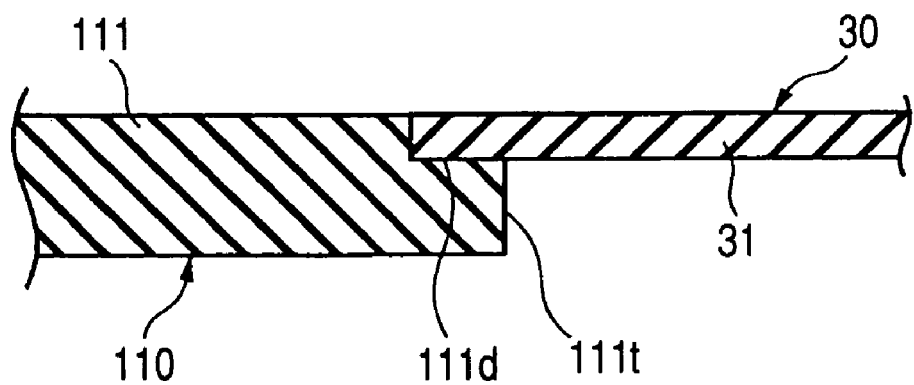
FIG. 18 is a partially enlarged sectional view illustrating another example of assembling the exciting device with the armored portion.
Figure 19:
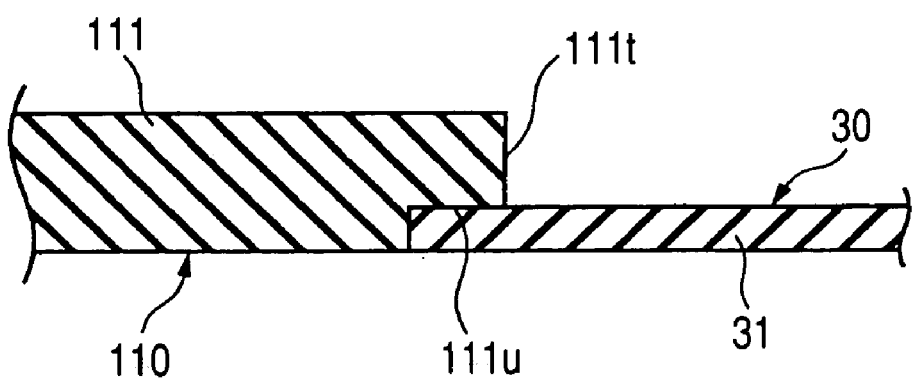
FIG. 19 is a partially enlarged sectional view illustrating another example of assembling the exciting device with the armored portion.

As illustrated in FIG. 18, a stepped portion 111d is formed at the edge on the surface of an attaching hole 111t formed in the armored portion 111 and the edge of the vibration substrate 31 may be fixed to the stepped portion 111d by an adhesive or a both-sided tape from the surface of the armored portion 111. As illustrated in FIG. 19, a stepped portion 111u is formed at the edge on the back side of the attaching hole 111t of the armored portion 111 and the vibration substrate 31 may be inserted into the stepped portion 111u from the back side of the armored portion 111 to thus fix the vibration substrate 31 to the stepped portion 111u.

Figure 20:
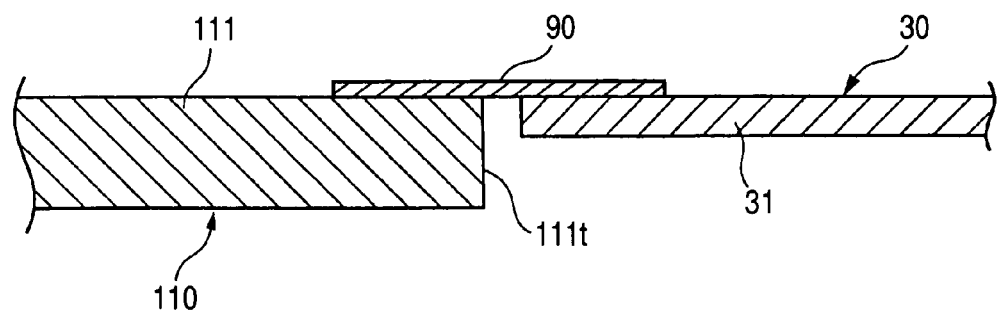
FIG. 20 is a partially enlarged sectional view illustrating another example of assembling the exciting device with the armored portion.

As illustrated in FIG. 20, the position of the vibration substrate 31 in the attaching hole 111t of the armored portion 111 is determined and the surface of the vibration substrate 31 and the surface of the armored portion 111 may be attached to each other by a pressure reducing adhesive with a sheet member 90 made of synthetic resin interposed. Therefore, when the vibration substrate 31 vibrates, the sheet member 90 is bent so that the vibration substrate 31 more significantly vibrates.

Figure 21:
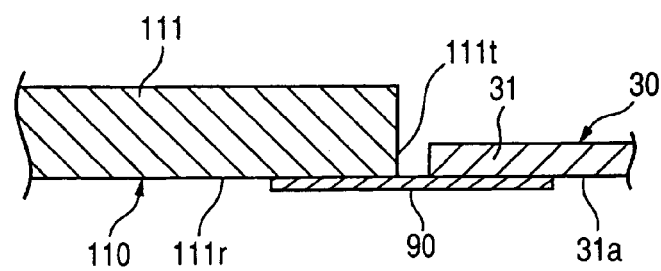
FIG. 21 is a partially enlarged sectional view illustrating another example of assembling the exciting device with the armored portion.

As illustrated in FIG. 21, the vibration substrate 31 is inserted into the attaching hole 111t of the armored portion 111 so that the back side 31a of the vibration substrate 31 and the back side 111r of the armored portion 111 are attached to each other by the pressure reducing adhesive with the sheet member 90 interposed.

Figure 22:
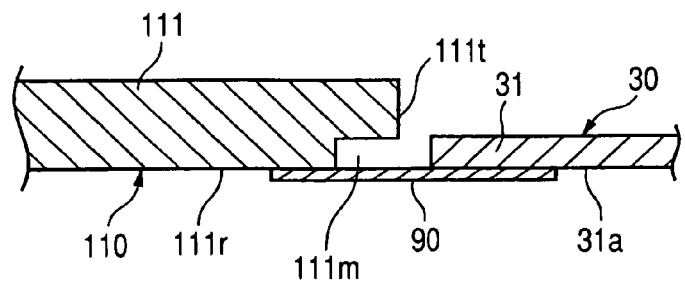
FIG. 22 is a partially enlarged sectional view illustrating another example of assembling the exciting device with the armored portion.

As illustrated in FIG. 22, a controlling portion 111m is formed by cutting the inside edge of the attaching hole 111t of the armored portion 111 along the vibration surface of the vibration substrate 31 so that the back side 31a of the vibration substrate 31 and the back side 111r of the armored portion 111 are attached to each other through the controlling portion 111m with the sheet member 90 interposed. In this case, when the vibration substrate 30 vibrates, it is possible to vibrate the vibration substrate 31 with larger amplitude. Therefore, it is possible to increase the output of the sound pressure.

Figure 23:
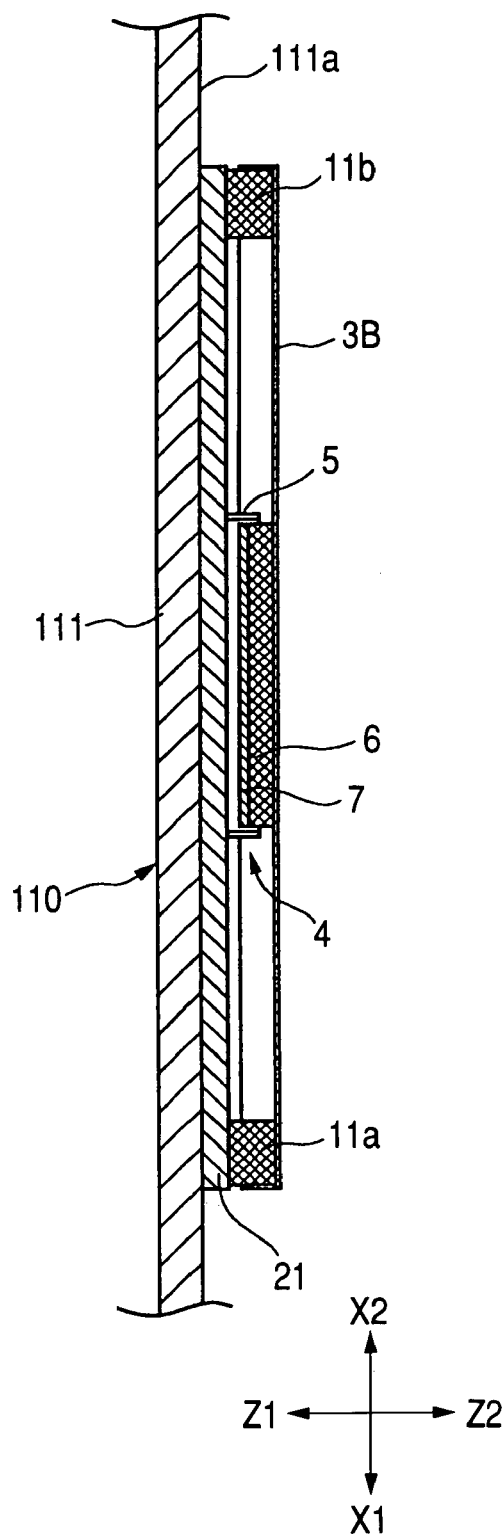
FIG. 23 is a sectional view illustrating another example of assembling the exciting device with the armored portion.

FIG. 23 is a sectional view illustrating the attachment structure of the exciting device 20. The exciting device 20 includes the vibration substrate 21, the exciting member 3B, and the vibration generating means 4. The vibration generating means 4 is a magnetic circuit composed of the coil 5 and the magnet 6, however, may be another vibration generating means such as the piezoelectric element.

As illustrated in FIG. 23, the entire surface of the vibration substrate 21 is fixed to the sound-producing vibration body 111a of the armored portion 111 by the pressure reducing adhesive such as the both-sided tape or the adhesive. Therefore, when the coil 5 is driven based on an audio signal, the exciting member 3B is vibrated so that the vibration is transmitted to the vibration substrate 21 through the fixing portions 11a and 11b. In addition, the vibration is transmitted to the sound-producing vibration body 111a so that sound is produced by the sound-producing vibration body 111a.

Figure 24:
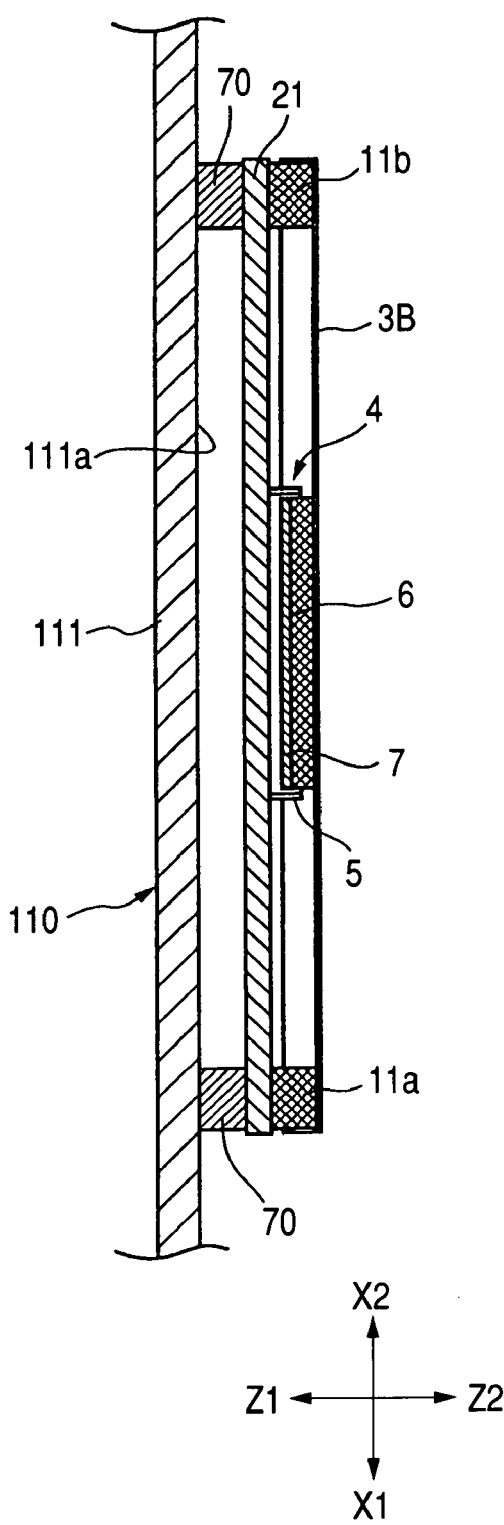
FIG. 24 is a sectional view illustrating another example of assembling the exciting device with the armored portion.

FIG. 24 is a sectional view illustrating another attachment structure of the exciting device 20. Parts of the vibration substrate 21 are fixed to the sound-producing vibration body 111a of the armored portion 111 with connection portions 70 and 70 formed of the pressure reducing adhesive such as the both-sided tape or the adhesive interposed. The connection portions 70 and 70 are provided so as to overlap the fixing portions 11a and 11b in the direction Z on both sides in the direction X of the vibration substrate 21. In addition, the vibration substrate 21 and the sound-producing vibration body 111a may be not fixed to each other by only the pressure reducing adhesive but may be fixed to each other by a screw member. In this case, when the exciting member 3B vibrates, the vibration substrate 21 vibrates and, at the same time, the sound-producing vibration body 111a vibrates.

Figure 25:
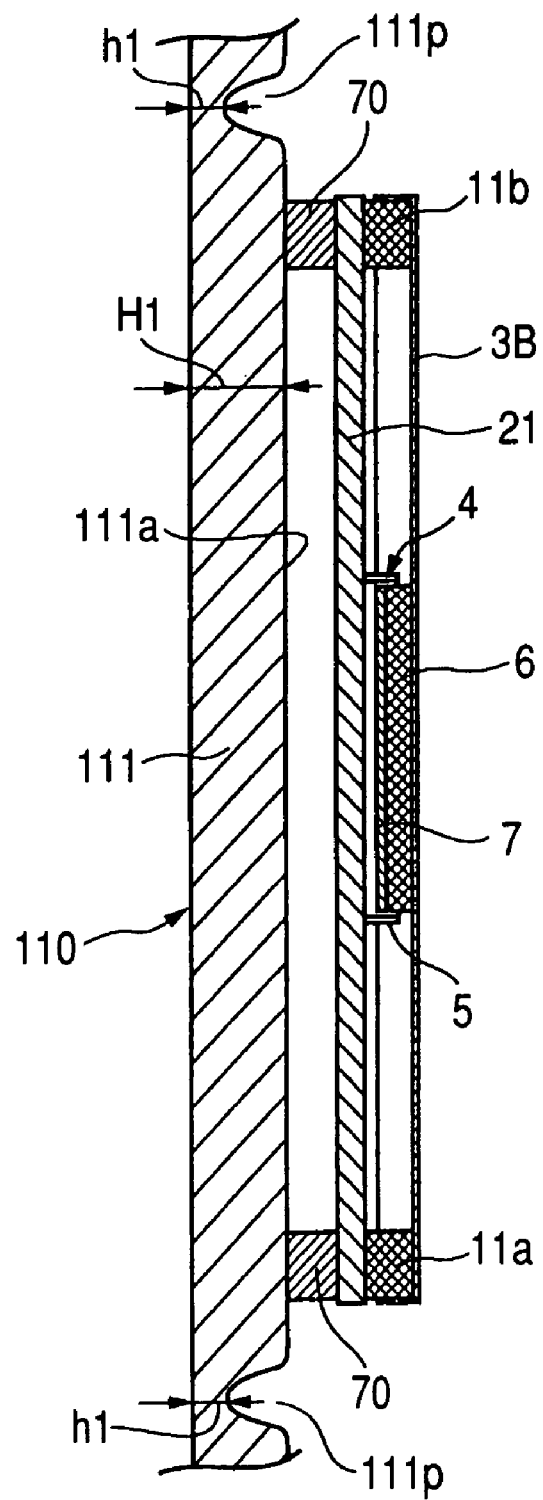
FIG. 25 is a sectional view illustrating another example of assembling the exciting device with the armored portion.

FIG. 25 is a modification of the attachment structure illustrated in FIG. 24. Notched recesses 111p and 111p are formed on the surface of the sound-producing vibration body 111a outside the connection portions 70 and 70 so that the thickness h1 of the sound-producing vibration body 111a in the positions where the grooves 111p and 111p are formed is smaller than the thickness Hi of another sound-producing vibration body 111a. Therefore, when the exciting member 3B vibrates, it is possible to easily vibrate the sound-producing vibration body 111a.

FIGS. 26 to 41 illustrate modifications of the exciting member 32A illustrated in FIG. 9. The transformed exciting member can function as a frequency controlling portion that changes the frequency of a produced sound.

Figure 26:
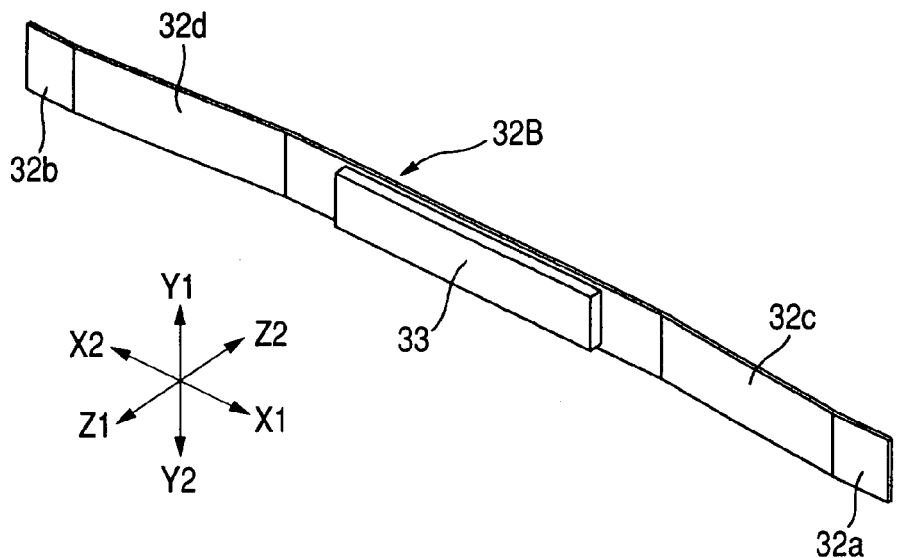
FIG. 26 is a perspective view illustrating a modification of the exciting member illustrated in FIG. 9.

An exciting member 32B illustrated in FIG. 26 is thin and long such that the length in the vertical direction (the direction X) is larger than the width in the horizontal direction (the direction Y). The exciting member 32B includes square fixing portions 32a and 32b on both ends in the direction X. The exciting member 32B includes tilted portions 32c and 32d obtained by bending both ends of the piezoelectric element as the vibration generating means fixed to the middle thereof to the direction Z1 at a slight angle. In addition, the angle at which the tilted portions 32c and 32d are bent is controlled so that the fixing portions 32a and 32b are parallel to the surface of the armored portion.

Figure 27:
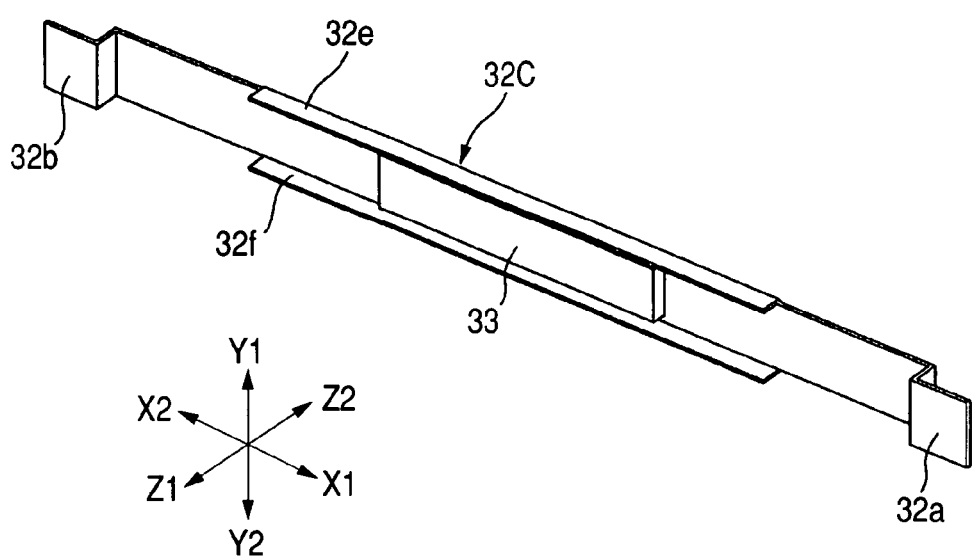
FIG. 27 is a perspective view illustrating another modification of the exciting member.

In an exciting member 32C illustrated in FIG. 27, bent portions 32e and 32f that extend in the direction X are integrated with both sides of the piezoelectric element 33. The bent portions 32e and 32f are formed such that the length in the direction X1-X2 is larger than the width in the direction X of the piezoelectric element 33. It is possible to appropriately change the width in the direction X of the bent portions 32e and 32f.

Figure 28:
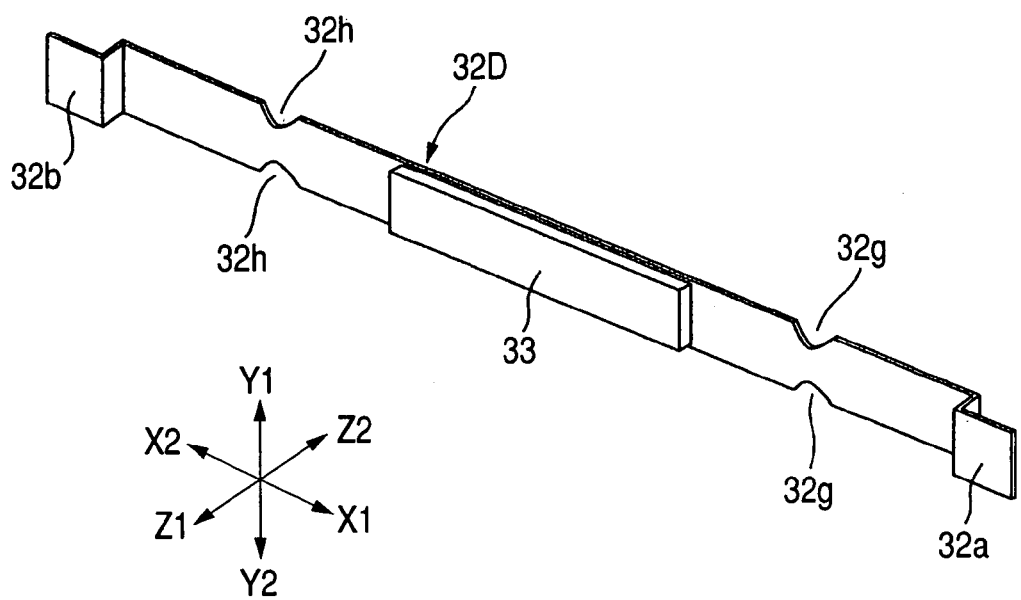
FIG. 28 is a perspective view illustrating another modification of the exciting member.

An exciting member 32D illustrated in FIG. 28 is a thin and long member extending along the vertical direction like the exciting member 32A illustrated in FIG. 9. The exciting member 32D is formed between the piezoelectric element 33 and the fixing portions 32a and 32b such that notched recesses 32g, 32g, 32h, and 32h at the edges on the sides Y1 and Y2 face each other. Therefore, the width of the exciting member 32D in the portions where the notched recesses 32g and 32h are formed is smaller than the width of the exciting member 32D in the other portions so that the exciting member 32D can be easily transformed. Therefore, it is possible to lower the resonance frequency of the exciting member 32D and to thus increase the bandwidth of the entire sound pressure.

In addition, the pairs of notched recesses 32g and 32h do not necessarily exist. Only one pair of notched recesses 32g and 32h may exist. In addition, the notched recesses 32g and 32h may exist in the direction X.

Figure 29:
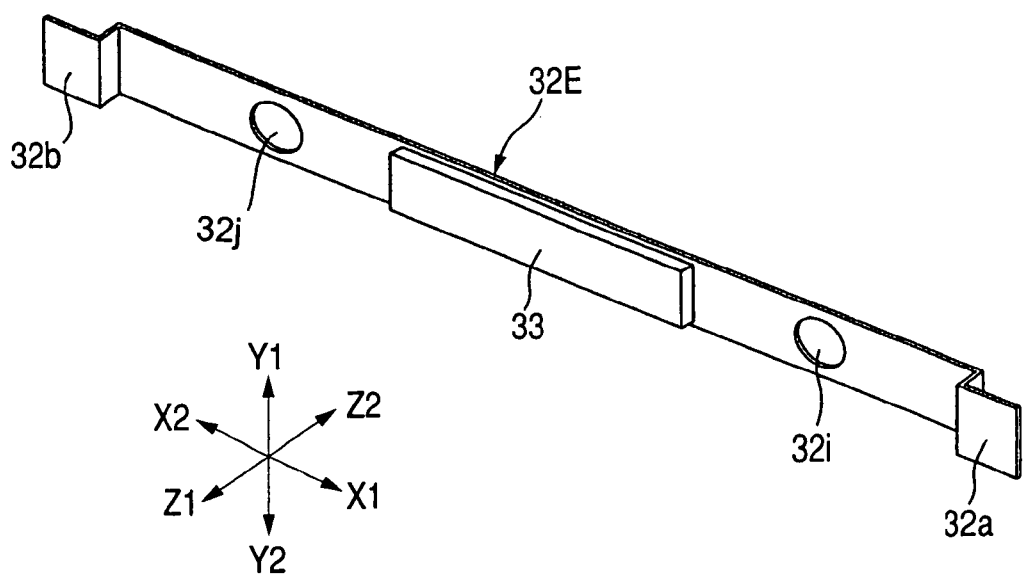
FIG. 29 is a perspective view illustrating another modification of the exciting member.

In an exciting member 32E illustrated in FIG. 29, circular through holes 32i and 32j are formed between the piezoelectric element 33 and the fixing portions 32a and 32b. In this case, bent transformation may easily occur in the portions where the through holes 32i and 32j exist so that it is possible to reduce the resonance frequency. In addition, the through holes 32i and 32j may be not restricted to be circular but may be elliptical, square, and triangular.

Figure 30:
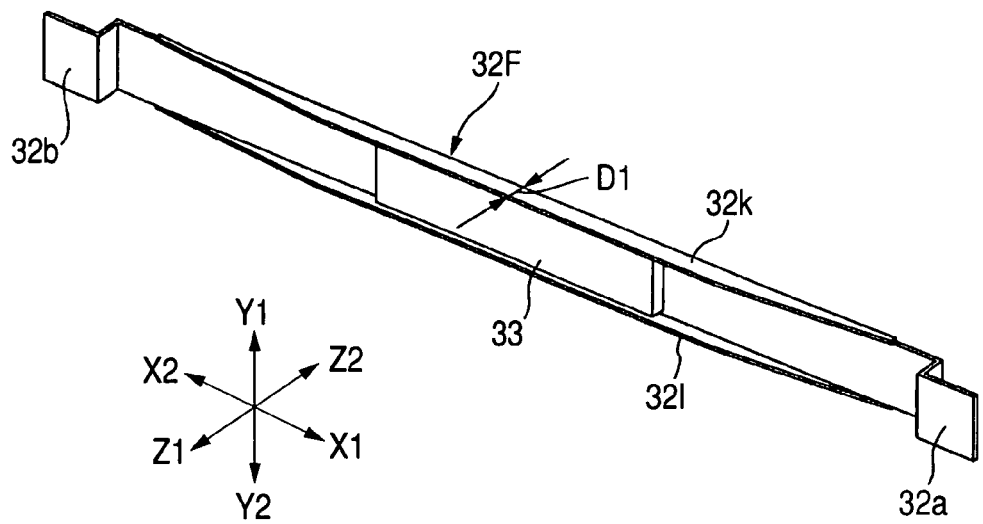
FIG. 30 is a perspective view illustrating another modification of the exciting member.

In an exciting member 32F illustrated in FIG. 30, bent portions 32k and 32l are formed on both edges in the direction Y between the fixing portions 32a and 32b. The bent portions 32k and 32l are formed such that the width D1 in the middle in the direction Z is the largest and that the width is gradually reduced toward the sides X1 and X2 from the middle in the X direction. In this case, unlike in the exciting members 32D and 32E illustrated in FIG. 28 or 29, it is difficult for the exciting member 32F to be transformed so that it is possible to increase the resonance frequency.

Figure 31:
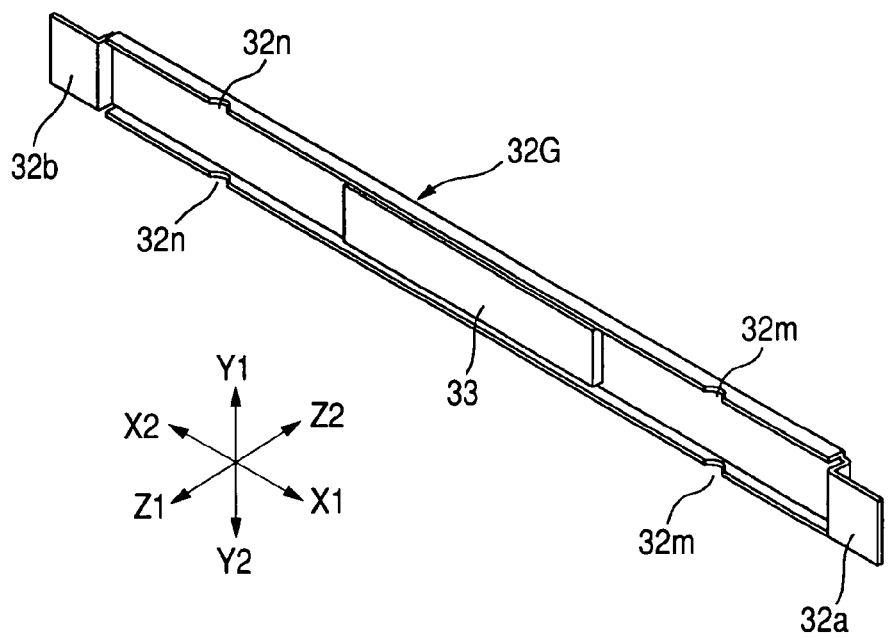
FIG. 31 is a perspective view illustrating another modification of the exciting member.

In an exciting member 32G illustrated in FIG. 31, bent portions formed like the bent portions 3c and 3d of the exciting member 3A illustrated in FIG. 1 are formed such that notched recesses 32m, 32m, 32n, and 32n toward the side Z1 are formed in the bent portions between the piezoelectric element 33 and the fixing portions 32a and 32b so as to face each other in the direction Y.

Figure 32:
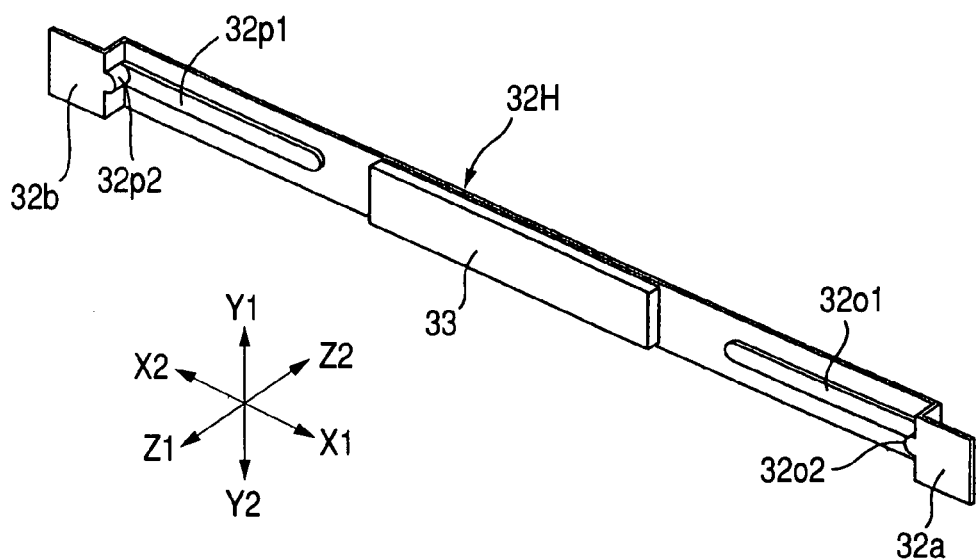
FIG. 32 is a perspective view illustrating another modification of the exciting member.

In an exciting member 32H illustrated in FIG. 32, convex portions 32o1 and 32p1 extending along the direction X are formed. In addition, on the stepped portion surfaces of the fixing portions 32a and 32b, convex portions 32o2 and 32p2 extended short in the direction Z are formed. Therefore, since it is difficult for the exciting member 32H to be transformed, it is possible to obtain a high resonance frequency.

Figure 33:
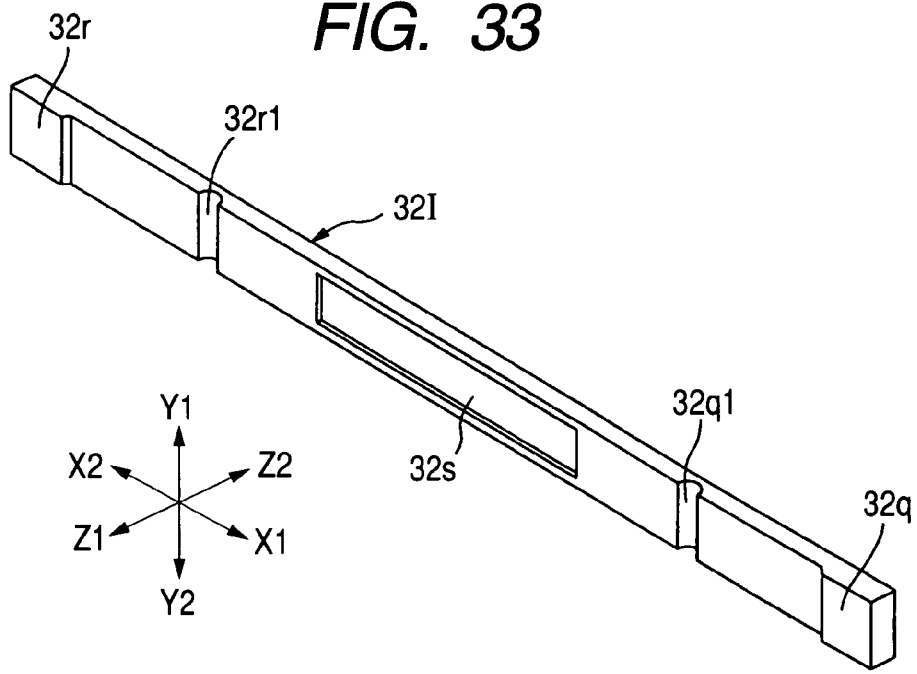
FIG. 33 is a perspective view illustrating another modification of the exciting member.

An exciting member 32I illustrated in FIG. 33 made of synthetic resin is thin and long such that the length in the vertical direction (the direction X) is larger than the width in the horizontal direction (the direction Y). The exciting member 32I is formed thick so that a concave mounting portion 32s thin and long in the vertical direction is formed in the middle thereof. In addition, fixing portions 32q and 32r protrude in both ends in the vertical direction of the exciting member 32I. The fixing portions 32q and 32r are fixed to the sound-producing vibration body 111a of the armored portion 111. In addition, grooves 32q1 and 32r1 that extend in the direction Y are formed in the surface on the side Z1 between the fixing portions 32q and 32r and the mounting portion 32s to be a small thickness. A plate shaped piezoelectric element is inserted into and fixed to the mounting portion 32s. Further, a magnetostriction oscillator may be used instead of the piezoelectric element.

As illustrated in FIG. 33, since the grooves 32q1 and 32r1 are formed, the exciting member 32I is easily transformed. In addition, the exciting member 32I is not restricted to this. The entire exciting member 32I may be the piezoelectric element to which electrodes are connected to thus vibrate. Therefore, since it is possible to integrate the exciting member with the vibration generating means, it is possible to reduce the number of parts and to thus reduce manufacturing costs.

Figure 34:
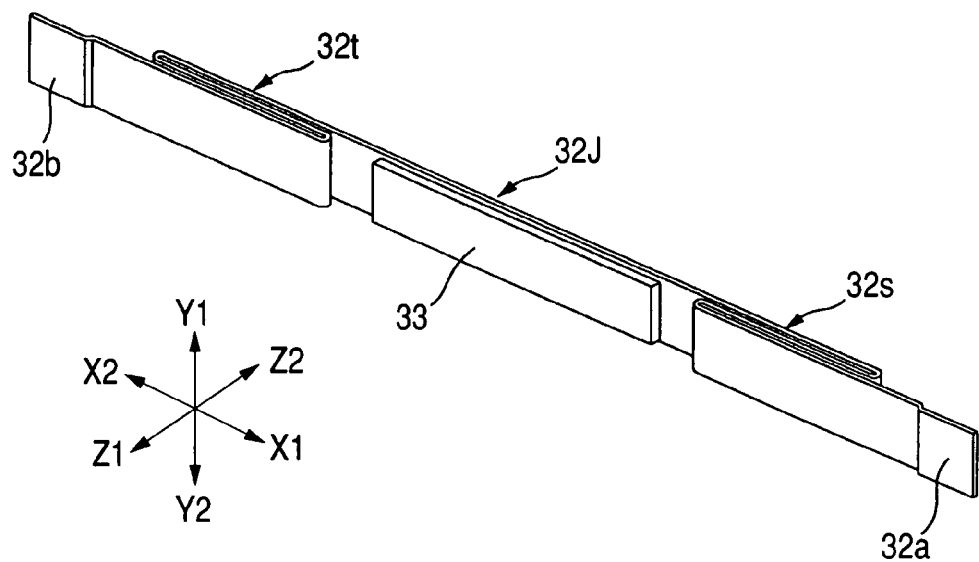
FIG. 34 is a perspective view illustrating another modification of the exciting member.

An exciting member 32J illustrated in FIG. 34 is formed such that the length in the vertical direction is larger than that of the exciting member 32A illustrated in FIG. 9 and that the exciting member 32J is bent twice in the reverse direction between the fixing portions 32a and 32b and the piezoelectric element 33 to thus form overlapping portions 32t and 32s. In this case, the actual length of the exciting member increases to thus lower the resonance frequency of the exciting member.

Figure 35:
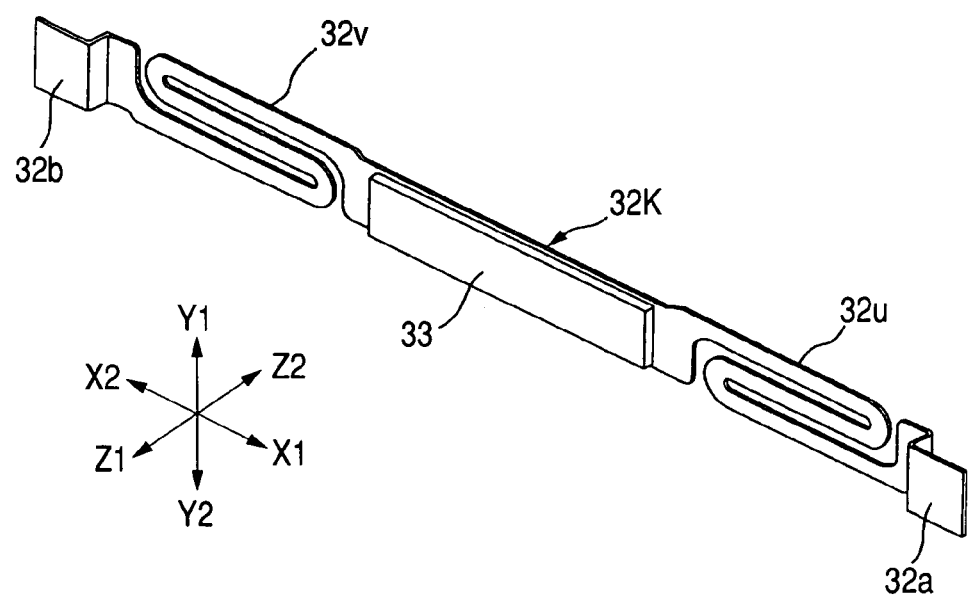
FIG. 35 is a perspective view illustrating another modification of the exciting member.

In addition, an exciting member 32K of FIG. 35 is formed so as to increase the actual length like the exciting member 32J of FIG. 34. According to the exciting member 32K, the width is small between the fixing portions 32a and 32b and the piezoelectric element 33, and zigzag portions 32u and 32v bent twice in the direction reverse with respect to the direction along the surface are formed. In this case, it is possible to lower the resonance frequency of the exciting member.

Figure 36:
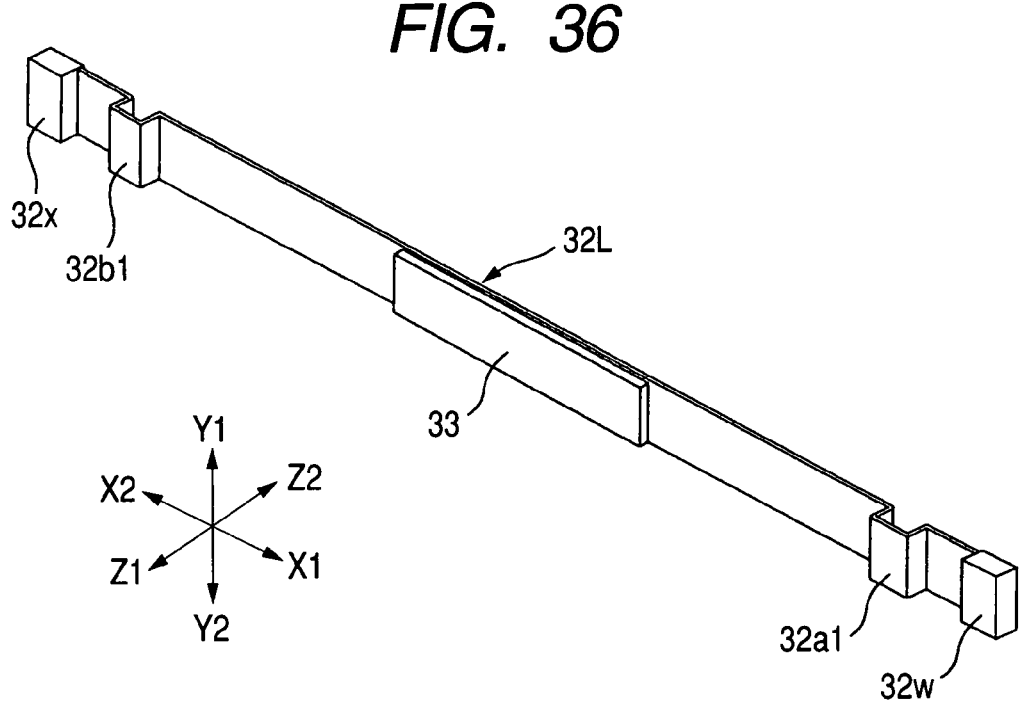
FIG. 36 is a perspective view illustrating another modification of the exciting member.

An exciting member 32L illustrated in FIG. 36 is thin and long in the vertical direction and includes fixing portions 32a1 and 32b1 bent to be convex on the side Z1 in the portions slightly moved toward the center than both ends in the vertical direction. Anchors 32w and 32x are fixed outside the fixing portions 32a1 and 32b1. In the exciting member 32L, the fixing portions 32a1 and 32b1 are fixed to the sound-producing body of the armored portion. When the exciting member 32L is vibrated by the driving power of the piezoelectric element 33, it is possible to forcibly and significantly vibrate the exciting member 32L by the anchors 32w and 32x. Therefore, it is possible to increase the output of the sound pressure.

According to the above-mentioned description, the magnetostriction oscillator may be mounted instead of the piezoelectric element as the vibration generating means.

Figure 37:
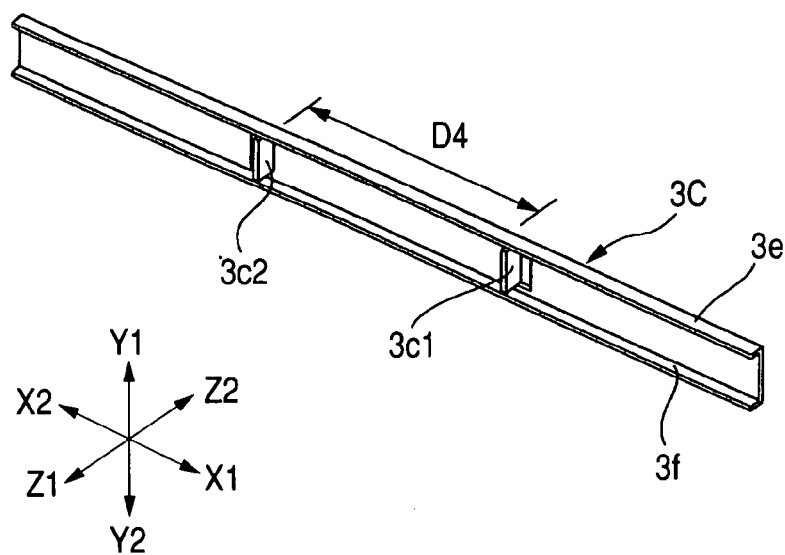
FIG. 37 is a perspective view illustrating another modification of the exciting member.
Figure 39:
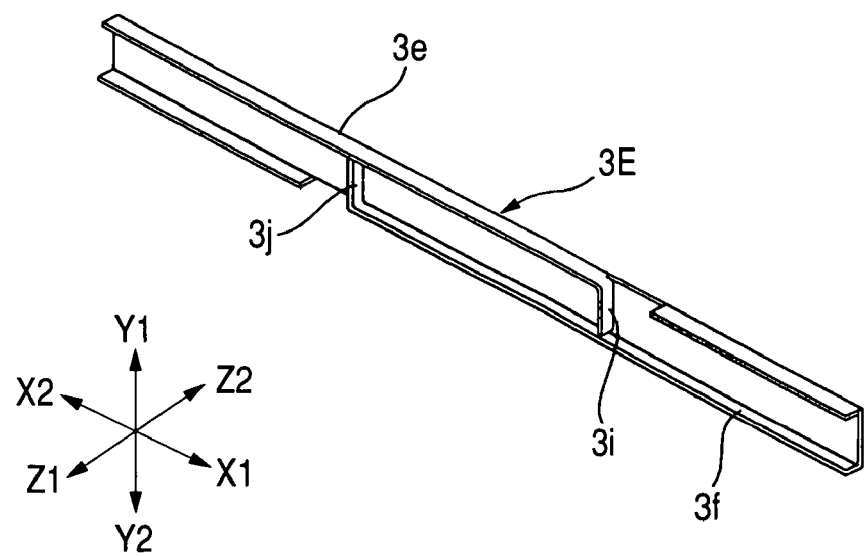
FIG. 39 is a perspective view illustrating another modification of the exciting member.

FIGS. 37 and 39 are modifications of the exciting member 3B illustrated in FIG. 3. The modifications may be applied to the exciting member 3A.

An exciting member 3C illustrated in FIG. 37 is thin and long such that the length in the vertical direction (the direction X) is larger than the width in the horizontal direction (the direction Y). A pair of cut and erected portions 3c1 and 3c2 is formed in the middle of the exciting member 3C in the vertical direction (the direction X). The distance D4 between the cut and erected portions 3c1 and 3c2 in the vertical direction is determined so that the magnet 6 can be inserted into the space between the cut and erected portions 3c1 and 3c2. As mentioned above, it is possible to improve the magnetic efficiency by forming the cut and erected portions 3c1 and 3c2 as well as the bent portions 3e and 3f.

Figure 38:
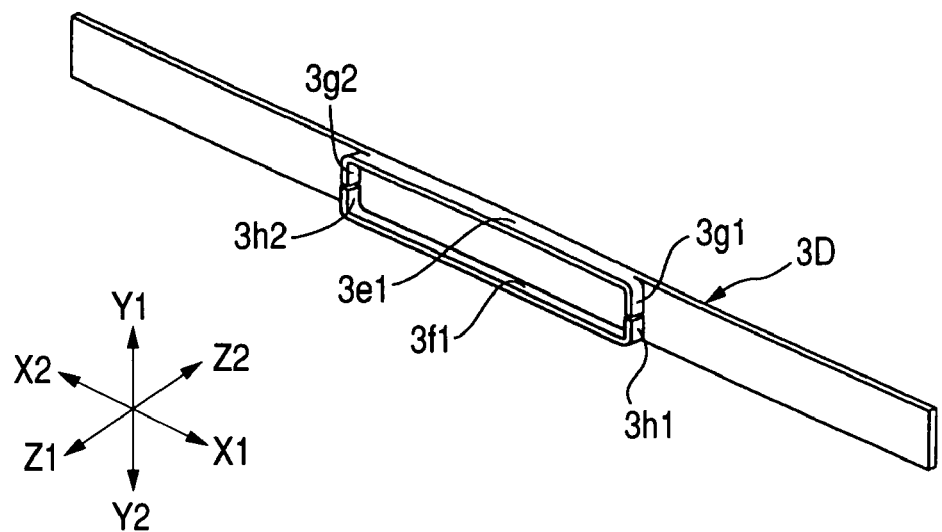
FIG. 38 is a perspective view illustrating another modification of the exciting member.

An exciting member 3D illustrated in FIG. 38 is thin and long in the vertical direction (the direction X) such that bent portions 3e1 and 3f1 are formed in the edges on the sides Y1 and Y2. The bent portions 3e1 and 3f1 are formed smaller than the size in the vertical direction of the exciting member 3D. Bent pieces 3g1 and 3g2 are formed in both ends of the bent portion 3e1 so as to be bent perpendicular to the side Y2. Bent pieces 3h1 and 3h2 are formed in both ends of the bent portion 3f1 so as to be bent perpendicular to the side Y1. Therefore, a frame is formed of the bent portions 3e1 and 3f1 and the bent pieces 3g1, 3g2, 3h1, and 3h2.

An exciting member 3E illustrated in FIG. 39 is obtained by forming bent pieces 3i and 3j in parts of the bent portions 3e and 3f of the exciting member 3B and by bending the bent piece 3i perpendicular to the side Y2 and the bent piece 3j perpendicular to the side Y1 so that a frame is formed by the bent portions 3e and 3f and the bent pieces 3i and 3j. In this case, like as mentioned above, the magnet 6 is fixed in the frame to thus improve the magnetic efficiency in the magnetic circuit.

FIGS. 40 to 44 illustrate methods of fixing the exciting member 32A to the vibration substrates 21 and 31 and the sound-producing vibration body 111a.

Figure 40:
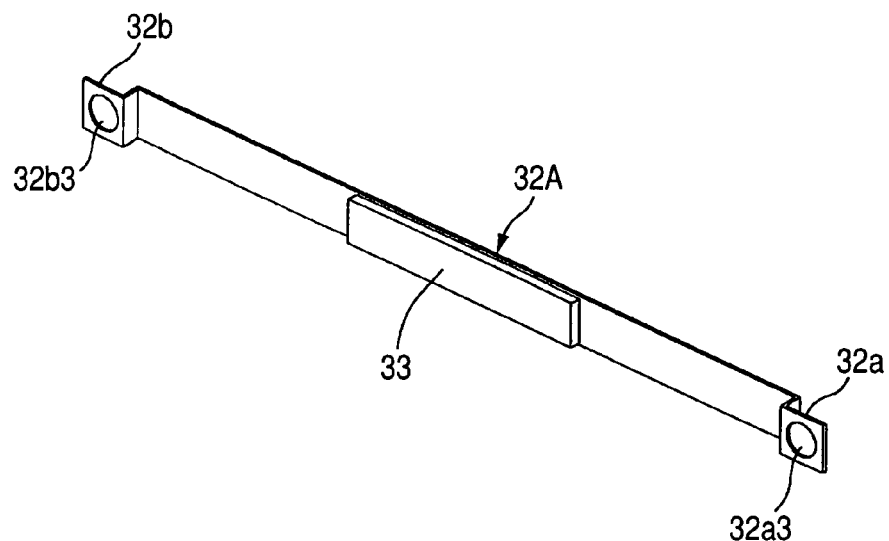
FIG. 40 is a perspective view illustrating a modification of a fixing portion provided in the exciting member.
Figure 41:
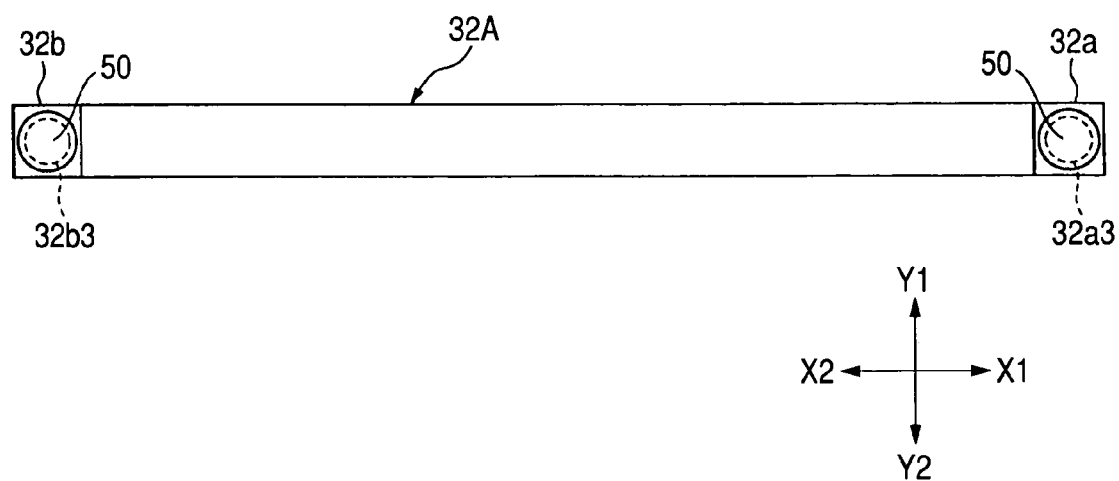
FIG. 41 is a plan view illustrating a state in which the fixing portion is adhesively fixed.

In FIG. 40, circular through holes 32a3 and 32b3 are formed in the fixing portions 32a and 32b of the exciting member 32A. After determining the positions of thus formed exciting member 32A in the vibration substrates 21 and 31 and the sound-producing vibration body 111a, the through holes 32a3 and 32b3 are coated with adhesives 50 and 50. At this time, as illustrated in FIG. 41, the adhesives 50 and 50 spread around the through holes 32a3 and 32b3 to thus prevent the exciting member 32A from easily coming out of the vibration substrates. Therefore, it is possible to improve the adhesive strength between the exciting member 32A and the vibration substrates 21 and 31.

Figure 42:
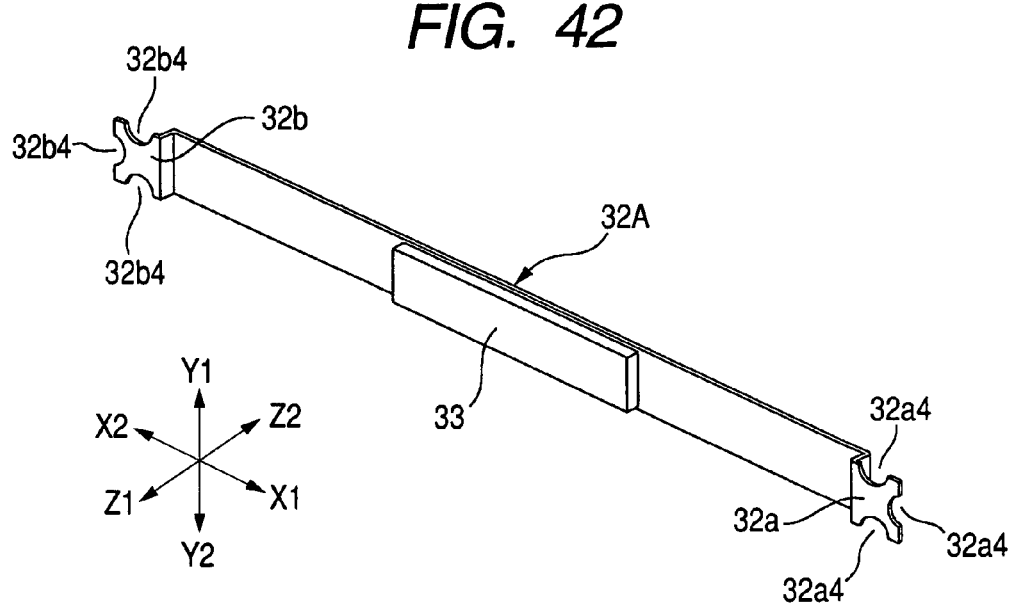
FIG. 42 is a perspective view illustrating another modification of the fixing portion.
Figure 43:
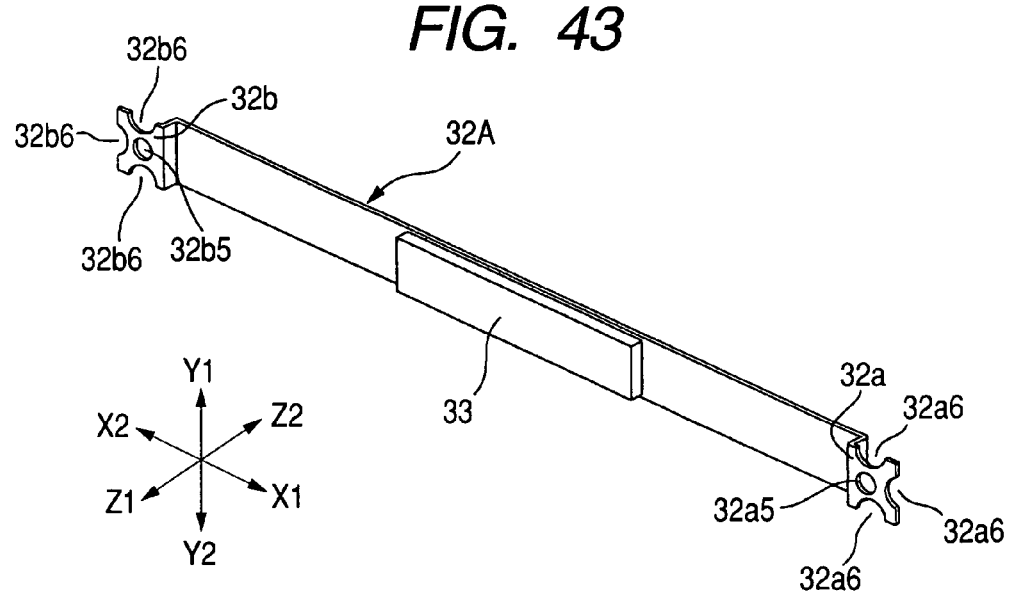
FIG. 43 is a perspective view illustrating another modification of the fixing portion.

As illustrated in FIG. 42, semi-circular notched recesses 32a4 and 32b4 are formed at the edges toward the sides X1, X2, Y1, and Y2 of the fixing portions 32a and 32b. In this case, like the above-mentioned description, when the notched recesses 32a4 and 32b4 are coated with the adhesives, it is possible to prevent the exciting member 32A from coming out of the notched recesses 32a4 and 32b4. FIG. 43 is a combination of FIGS. 40 and 42. Circular through holes 32a5 and 32b5 are formed in the middle of the fixing portions 32a and 32b. A plurality of semi-circular notched recesses 32a6 and 32b6 are formed around the circular through holes 32a5 and 32b5. Therefore, the area of the surface to which the exciting member 32A is attached increases so that it is possible to improve the adhesive strength and to further prevent the exciting member 32A from coming out of the through holes 32a5 and 32b5.

Figure 44:
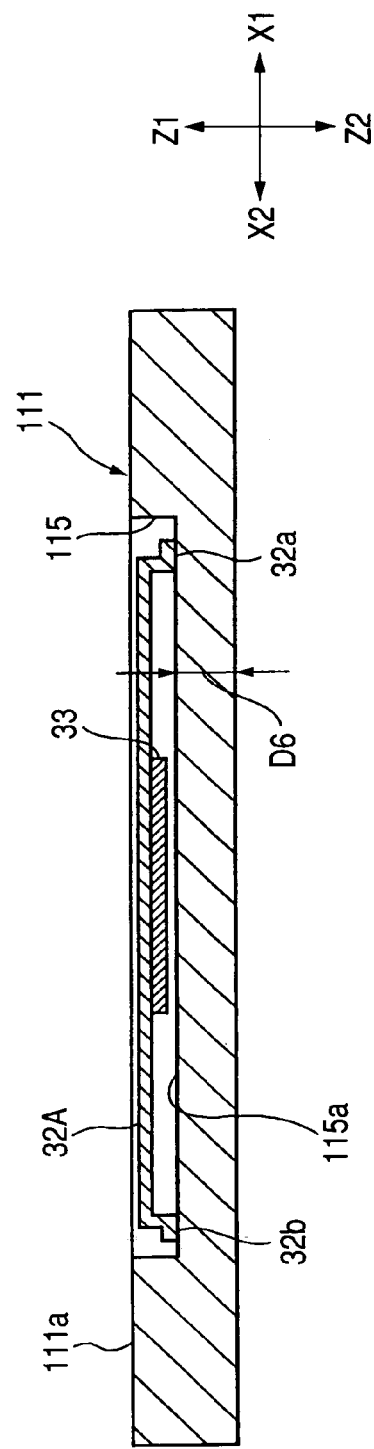
FIG. 44 is a sectional view illustrating the entire attachment structure of the exciting device.

FIG. 44 illustrates a sectional structure when the exciting member 32A is directly attached to the sound-producing vibration body 111a of the armored portion 111 of an electronic apparatus. As illustrated in FIG. 44, the piezoelectric element 33 is fixed to the middle in the longitudinal direction of the exciting member 32A. A concave provision portion 115 thin and long in the direction X is provided in the surface of the sound-producing vibration body 111a. The fixing portions 32a and 32b of the exciting member 32A are fixed to the bottom surface 115a of the installation portion 115.

Therefore, the vibration of the exciting member 32A is transmitted to the sound-producing vibration body 111a so that sound is produced by the sound-producing vibration body 111a. At this time, it is possible to produce sound by the exciting member 32A. When the concave provision portion 115 is formed, it is possible to reduce the thickness D6 of the sound-producing vibration body 111a and to thus easily vibrate the sound-producing vibration body 111a.

Figure 45:
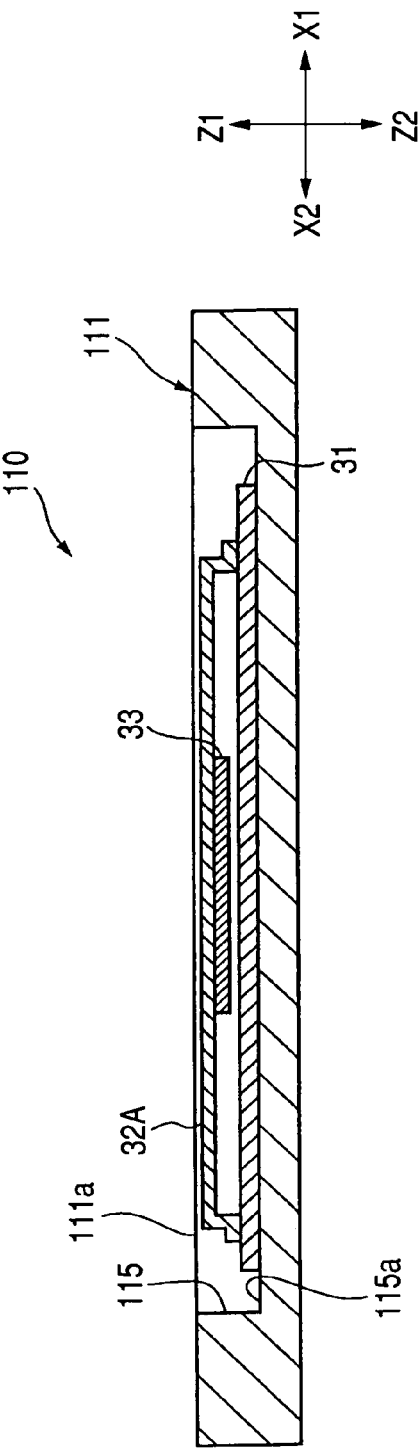
FIG. 45 is a sectional view illustrating the entire attachment structure of the exciting device.

FIG. 45 is a sectional view in the case where the exciting device 30 illustrated in FIG. 9 is provided in the concave provision portion 115. As illustrated in FIG. 45, the exciting member 32A is fixed to the vibration substrate 31 and the entire surface or the part of the vibration substrate 31 is fixed to the bottom surface 115a of the provision portion 115. Therefore, in this case, the vibration of the exciting member 32A is transmitted to the sound-producing vibration body 111a through the vibration substrate 31 so that the sound-producing vibration body 111a produces sound.

Figure 46:
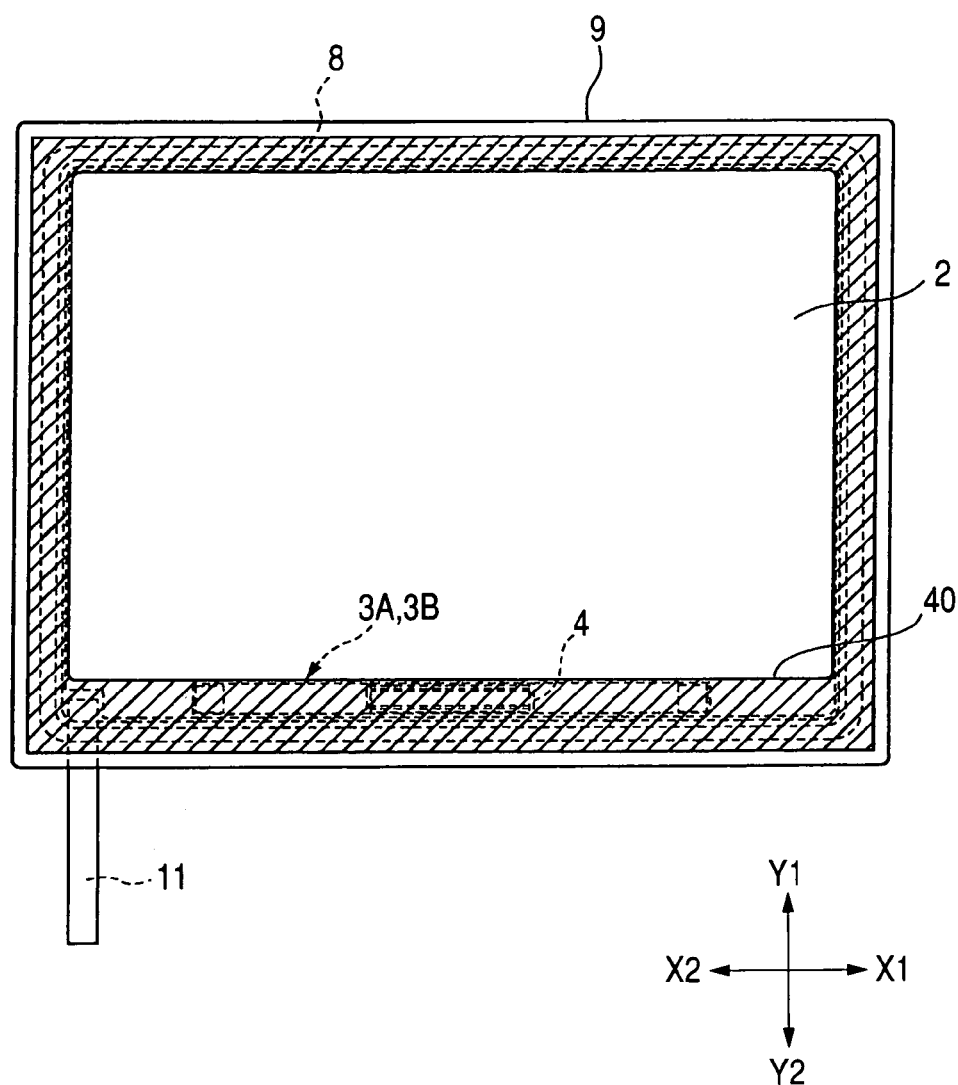
FIG. 46 is a plan view illustrating a state in which a shielding sheet is provided on a transparent substrate.

As illustrated in FIG. 46, in the exciting member 10 illustrated in FIGS. 1 and 3, a black opaque shielding sheet 40 is fixed around the transparent substrate 2 (the portion represented by slanting lines) by an adhesive. Therefore, in the case of a display device in which the display panel 101 is provided on the back side of the transparent substrate 2, it is possible to hide the vibration generating means 4 and the elastic member 8 so as not to be seen by a user.

In the exciting device illustrated in FIGS. 1 and 3, the member vibrated by the exciting member is the transparent substrate, however, may be an opaque vibration substrate mounted in the armored portion of the electronic apparatus.

In addition, the example of mounting the exciting device 10 in the electronic apparatus is not limited to a mobile phone but also can be applied to the surface of the display panel mounted in a digital still camera, a video camera, and an electronic dictionary. Also, according to the example of mounting the exciting device 20 in the electronic apparatus, the exciting device 20 can be assembled with a part around the display panels of the digital still camera and the video camera.

According to the example of mounting the exciting devices 20 and 30 in the electronic apparatus, it is possible to mount the exciting devices 20 and 30 in the armored portions of portable audio devices such as an MD, a CD, a DVD, and a television set and electronic home appliances such as a personal computer, an electronic microwave oven, a washing machine, and a refrigerator.

As mentioned above, according to the exciting device of the present invention, the exciting member can be directly attached to the sound-producing vibration body of the main body of the apparatus or can be attached to the sound-producing vibration body of the main body of the apparatus with the vibration substrate interposed. Therefore, it is possible to produce sound by the armored portion by the output equal to or more than a predetermined output without preventing the main body of the apparatus from being miniaturized.

Also, the display device according to the present invention is provided on the surface of the display panel. The exciting member vibrates with large amplitude due to the vibration transmitted by the vibration generating means and the vibration is transmitted to the transparent substrate so that the transparent substrate vibrates with large amplitude due to the transmission of the vibration. Therefore, it is possible to obtain sound of a large output from the transparent substrate.

What is claimed is:

1. An exciting device, comprising:
a thin and long exciting member whose length is larger than width; and
vibration generating means for vibrating the exciting member, wherein the vibration generating means comprises a magnet fixed to a middle of the exciting member or the sound-producing vibration body; and a coil fixed to the other of the middle of the exciting member or the sound-producing vibration body, wherein vibration is transmitted to the exciting member by current that flows to the coil and a magnetic field that is generated by the magnet and crosses the coil,
wherein the exciting member made of a magnetic material functions as a magnetic yoke that transmits the magnetic field generated by the magnet,
wherein both ends in a vertical direction of the exciting member are fixed to a sound-producing vibration body of a main body of an apparatus, and
wherein the vibration of the exciting member is transmitted to the sound-producing vibration body through the both ends of the exciting member so that the sound-producing vibration body produces sound.

2. The exciting device according to claim 1, wherein a pressure reducing adhesive layer capable of being attached to the sound-producing vibration body is provided on a vibration substrate, the vibration substrate capable of being attached to a position of the sound-producing vibration body.

3. The exciting device according to claim 1,
wherein the coil is formed such that vertical electric conduction paths through which current flows in the vertical direction of the exciting member is longer than horizontal electric conduction paths through which current flows in the horizontal direction of the exciting member, and
wherein the magnet is formed such that sides that face the vertical electric conduction path are thinner and longer than ends that face the horizontal electric conduction path.

4. The exciting device according to claim 3,
wherein bent portions whose both sides extending along the vertical direction are bent are provided in the exciting member,
wherein the bent portions face the sides of the magnet,
wherein the vertical electric conduction paths of the coil are positioned between the bent portions and the sides of the magnet, and
wherein the bent portions function as counter yokes.

5. The exciting device according to claim 1, wherein the exciting member has a frequency controlling portion provided between the both ends and the vibration generating means.

6. The exciting device according to claim 5, wherein, in the frequency controlling portion, a sectional area of the exciting member is smaller than a sectional area of other portions so that the resonance frequency of the exciting member is lowered.

7. The exciting device according to claim 5, wherein, in the frequency controlling portion, the actual length from the vibration generating means to the both ends increases so that a resonance frequency of the exciting member is lowered.

8. The exciting device according to claim 5, wherein, in the frequency controlling portion, a section of the exciting member is transformed so that a resonance frequency of the exciting member is high.

9. The exciting device according to claim 1, wherein current based on an audio signal is applied to the vibration generating means so that the sound-producing vibration body produces voice or music.

10. An exciting device, comprising:
a thin and long exciting member whose length is larger than width;
a vibration substrate to which both ends in a vertical direction of the exciting member are directly fixed or are indirectly fixed with another member interposed; and
vibration generating means for vibrating the exciting member, wherein the vibration generating means comprises a magnet fixed to a middle of the exciting member or the vibration substrate; and a coil fixed to the other of the middle of the exciting member or the vibration substrate, wherein vibration is transmitted to the exciting member by current that flows to the coil and a magnetic field that is generated by the magnet and crosses the coil,
wherein the exciting member made of a magnetic material functions as a magnetic yoke that transmits the magnetic field generated by the magnet,
wherein the vibration substrate is directly fixed to or indirectly fixed to sound-producing vibration body, and
wherein the vibration of the exciting member is transmitted to the sound-producing vibration body through the vibration substrate so that the sound-producing vibration body produces sound.

11. The exciting device according to claim 10, wherein a pressure reducing adhesive layer capable of being attached to the sound-producing vibration body is provided on the vibration substrate.

12. The exciting device according to claim 10,
wherein the coil is formed such that vertical electric conduction paths through which current flows in the vertical direction of the exciting member is longer than horizontal electric conduction paths through which current flows in a horizontal direction of the exciting member, and
wherein the magnet is formed such that sides that face the vertical electric conduction path are thinner and longer than ends that face the horizontal electric conduction path.

13. The exciting device according to claim 12,
wherein bent portions whose both sides extending along the vertical direction are bent are provided in the exciting member,
wherein the bent portions face the sides of the magnet,
wherein the vertical electric conduction paths of the coil are positioned between the bent portions and the sides of the magnet, and
wherein the bent portions function as counter yokes.

14. The exciting device according to claim 10, wherein the exciting member has a frequency controlling portion provided between the both ends and the vibration generating means.

15. The exciting device according to claim 14, wherein, in the frequency controlling portion, a sectional area of the exciting member is smaller than a sectional area of other portions so that a resonance frequency of the exciting member is lowered.

16. The exciting device according to claim 14, wherein, in the frequency controlling portion, an actual length from the vibration generating means to the both ends increases so that a resonance frequency of the exciting member is lowered.

17. The exciting device according to claim 14, wherein, in the frequency controlling portion, a section of the exciting member is transformed so that a resonance frequency of the exciting member is high.

18. The exciting device according to claim 10, wherein current based on an audio signal is applied to the vibration generating means so that the sound-producing vibration body produces voice or music.

19. A display device, comprising:
a transparent substrate that constitutes a display panel or a transparent substrate positioned on a surface of the display panel so that a user sees the display panel through the transparent substrate;
an exciting member that includes fixing portions, has an area smaller than an area of the transparent substrate and is directly fixed to the transparent substrate or indirectly fixed to the transparent substrate with another member interposed through the fixing portions; and
vibration generating means for vibrating the exciting member, wherein the vibration generating means comprises a magnet fixed to the transparent substrate or the exciting member; and a coil fixed to the other of the transparent substrate or the exciting member, wherein vibration is transmitted to the exciting member by current that flows to the coil and a magnetic field that is generated by the magnet and crosses the coil,
wherein the exciting member made of a magnetic material functions as a magnetic yoke that transmits the magnetic field generated by the magnet, and
wherein sound is produced by the transparent substrate by the vibration of the exciting member and the vibration of the transparent substrate, the vibration of the transparent substrate being transmitted from the exciting member through the fixing portions of the exciting member.

20. The display device according to claim 19,
wherein the exciting member is long and thin such that a length is larger than a width,
wherein both ends in a vertical direction of the exciting member are fixed to the transparent substrate, and
wherein the vibration generating means is positioned between fixing portions for fixing the exciting member to the transparent substrate.

21. The display device according to claim 19,
wherein the coil is formed such that vertical electric conduction paths through which current flows in a vertical direction of the exciting member is longer than horizontal electric conduction paths through which current flows in a horizontal direction of the exciting member, and
wherein the magnet is formed such that sides that face the vertical electric conduction path are thinner and longer than ends that face the horizontal electric conduction path.

22. The display device according to claim 19, wherein an elastic coefficient of the exciting member due to bending per unit area is smaller than an elastic coefficient of the transparent substrate due to bending per unit area.

23. The display device according to claim 19,
wherein the transparent substrate is fixed to a frame with an elastic member interposed around the transparent substrate, and
wherein the frame is fixed around a display window of a main body of an apparatus.

24. The display device according to claim 19, wherein the transparent substrate is fixed around a display window of a main body of an apparatus with an elastic member interposed around the transparent substrate.

25. The display device according to claim 19,
wherein the transparent substrate is fixed to a frame with an elastic member interposed around the transparent substrate, and
wherein the frame is fixed to the display panel.

26. The display device according to claim 19, wherein the transparent substrate is fixed to a display panel with an elastic member interposed around the transparent substrate.

27. The display device according to claim 19, wherein the transparent substrate constitutes a part of an input panel.

28. The display device according to claim 19, wherein current based on an audio signal is applied to the vibration generating means so that voice or music is produced by the transparent substrate.

* * * * *